United States Patent
Sakamoto et al.

(10) Patent No.: US 11,618,108 B2
(45) Date of Patent: Apr. 4, 2023

(54) MOLDED SOLDER AND MOLDED SOLDER PRODUCTION METHOD

(71) Applicant: TAMURA CORPORATION, Tokyo (JP)

(72) Inventors: Isao Sakamoto, Iruma (JP); Akira Kitamura, Iruma (JP); Hiroaki Taniguchi, Iruma (JP)

(73) Assignee: TAMURA CORPORATION, Tokyo (JP)

( * ) Notice: Subject to any disclaimer, the term of this patent is extended or adjusted under 35 U.S.C. 154(b) by 175 days.

(21) Appl. No.: 16/576,700

(22) Filed: Sep. 19, 2019

(65) Prior Publication Data

US 2020/0101567 A1  Apr. 2, 2020

(30) Foreign Application Priority Data

Sep. 28, 2018 (JP) .............................. JP2018-185733
Mar. 25, 2019 (JP) .............................. JP2019-056194

(51) Int. Cl.
*B22F 3/00* (2021.01)
*B23K 35/30* (2006.01)
*B23K 35/26* (2006.01)

(52) U.S. Cl.
CPC .......... *B23K 35/302* (2013.01); *B23K 35/262* (2013.01)

(58) Field of Classification Search
CPC .... B23K 35/302; B23K 35/262; B23K 35/36; B23K 35/0244; B23K 35/40;
(Continued)

(56) References Cited

U.S. PATENT DOCUMENTS 5,229,070 A * 7/1993 Melton ................ B23K 35/025
  420/559
2009/0139608 A1* 6/2009 Tanaka .................. B22F 1/0059
  148/24
(Continued)

FOREIGN PATENT DOCUMENTS

CN    101208173    6/2008
CN    101479073    7/2009
(Continued)

OTHER PUBLICATIONS

Aim Solder "SAC305 Lead-Free Solder Alloy", 2017, Aim Solder, p. 1 (Year: 2017).*
(Continued)

*Primary Examiner* — Mary I Omori
(74) *Attorney, Agent, or Firm* — Mori & Ward, LLP

(57) ABSTRACT

Molded solder includes first metal powder and second metal powder. The first metal powder has a first solidus temperature and a first liquidus temperature and includes an alloy containing metal elements. The second metal powder has a melting temperature or a second solidus temperature and a second liquidus temperature and includes single metal element or an alloy containing metal elements. The melting temperature and the second liquidus temperature are higher than the first liquidus temperature. The molded solder is so constructed that a mixture of the first metal powder and the second metal powder are press-molded. The molded solder is so constructed that a first solidus temperature of a solder becomes higher when the molded solder becomes the solder after the first metal powder has been melted by heating the molded solder at a temperature equal to or higher than the first liquidus temperature.

8 Claims, 17 Drawing Sheets

(58) Field of Classification Search
CPC .... B23K 2103/12; B22F 7/02; B22F 2998/00; B22F 3/02; B22F 1/0011; C22C 1/0425; C22C 1/0466; C22C 1/0483; C22C 13/00; C22C 9/00; Y10T 428/12708; Y10T 428/12861; Y10T 428/12868
USPC ........ 228/262.61, 248.1, 56.3; 428/646, 668, 428/669; 420/557
See application file for complete search history.

(56) References Cited

U.S. PATENT DOCUMENTS

| | | | | |
|---|---|---|---|---|
| 2009/0220812 A1* | 9/2009 | Kato | ..................... | B23K 35/26 428/548 |
| 2011/0180311 A1* | 7/2011 | Tsuda | ................... | B23K 1/0016 174/260 |
| 2014/0199115 A1* | 7/2014 | de Avila Ribas | .... | B23K 35/264 403/272 |
| 2019/0084093 A1* | 3/2019 | Sakata | ................... | H01L 24/13 |
| 2020/0306894 A1* | 10/2020 | Shearer | ................ | C22C 1/0425 |

FOREIGN PATENT DOCUMENTS

| | | | | |
|---|---|---|---|---|
| CN | 101500744 | | 8/2009 | |
| CN | 105081622 | | 11/2015 | |
| CN | 105121677 | | 12/2015 | |
| CN | 106715039 | | 5/2017 | |
| EP | 1864750 | | 12/2007 | |
| JP | 63-260698 | | 10/1988 | |
| JP | 6-31486 | | 2/1994 | |
| JP | 2003245793 A | * | 9/2003 | |
| JP | 2004-160515 | | 6/2004 | |
| JP | 2004363052 A | * | 12/2004 | ............ H01B 13/00 |
| JP | 2008-183582 | | 8/2008 | |
| JP | 5245410 B2 | | 7/2013 | |
| JP | 2014-527466 | | 10/2014 | |
| KR | 20160028015 A | * | 3/2016 | ............ B23K 35/26 |
| KR | 20170084544 A | * | 7/2017 | |
| WO | WO 2004/060604 | | 7/2004 | |
| WO | WO-2010098357 A1 | * | 9/2010 | .......... B23K 35/262 |
| WO | WO 2013/017885 | | 2/2013 | |
| WO | WO-2016133114 A1 | * | 8/2016 | ................ C09J 7/20 |
| WO | WO-2019113208 A1 | * | 6/2019 | ............ B22F 1/0059 |

OTHER PUBLICATIONS

Yang et al. "Properties and Microstructures of Sn—Bi-X Lead-Free Solders", 2016, Advances in Materials Science and Engineering, 9265195, p. 1-15. (Year: 2016).*
Barbera et al. "Copper" 2003, Properties and Deterimination, p. 1634 (Year: 2003).*
European Steel "Technological Properties of Grade S—Sn97Cu3", 2017, European Steel and Alloy Grades/Numbers, p. 1-2. (Year: 2017).*
MatWeb "In50—Sn50 Indium-Tin Solder", 2022 (Year: 2022).*
Katsuhiko Igarashi, machine translation of JP 2003-245793 Abstract, Claims and Description, Sep. 2, 2003 (Year: 2003).*
Lee et al., machine translation of KR 2017-0084544 Absract, Claims and Description, Jul. 20, 2017 (Year: 2017).*
Japanese Office Action for corresponding JP Application No. 2019-056194, dated Aug. 25, 2020 (w/ machine translation).
Japanese Office Action for corresponding JP Application No. 2019-056194, dated Mar. 31, 2020.
Extended European Search Report for corresponding EP Application No. 19198136.4-1103, dated Nov. 18, 2019.
Chinese Office Action for corresponding CN Application No. 201910865300.9, dated Feb. 25, 2022 (w/ English machine translation).

* cited by examiner

—Example 3) Before heating molded solder

—Example 4) Before heating molded solder

Heat Flow [W/g] — (1)Sn-3.0Ag-0.5Cu solder alloy and Sn-50In solder alloy DSC chart (1) of Example (1) at each heating temperature

—150°C    ---180°C

Heat Flow [W/g] — (1)Sn-3.0Ag-0.5Cu solder alloy and Sn-50In solder alloy DSC chart (2) of Example (1) at each heating temperature

—190°C    ---200°C

—Example 5) Before heating molded solder

—Example 6) Before heating molded solder

—Example 10) Before heating molded solder

—Example 9) After heating molded solder

—Example 10) After heating molded solder

—Example 11) Before heating molded solder

—Example 14) Before heating molded solder

—Example 11) After heating molded solder

MOLDED SOLDER AND MOLDED SOLDER PRODUCTION METHOD

CROSS-REFERENCE TO RELATED APPLICATIONS

The present application claims priority under 35 U.S.C. § 119 to Japanese Patent Application No. 2018-185733, filed Sep. 28, 2018, and Japanese Patent Application No. 2019-56194, filed Mar. 25, 2019. The contents of these applications are incorporated herein by reference in their entirety.

BACKGROUND

Technical Field

The present invention relates to a molded solder and a molded solder production method.

Related Art

As a bonding material that bonds electronic elements to an electronic circuit formed on an electronic circuit board, a solder alloy is used in many cases.

Recently, from the viewpoint of energy and environmental problems, power semiconductor elements, that is, power semiconductors that control and supply power have been gaining attention. Examples of the power semiconductor material include silicon (Si), silicon carbide (SiC), and gallium nitride (GaN).

Conventionally, Si elements have been widely used as the power semiconductor.

Here, the power semiconductor generates heat due to Joule heat generated when using an electronic product in which the power semiconductor is incorporated. However, in the case of the conventional Si elements, those elements only have a heat resistance of about 150° C. Accordingly, when those elements are heated to a temperature higher than that temperature, there is a problem that the function as a semiconductor is lost.

For that reason, the operating temperature of the Si element is kept at 150° C. or lower. Then, as the heat resistance of the bonding material, the bonding material may have a melting temperature of 150° C. or higher. Bonding (die bonding) using the bonding material (solder alloy or the like) of which a solidus temperature is equal to or higher than 150° C. and lower than 300° C. is performed.

However, in recent years, SiC elements having less power loss and capable of handling a large current are becoming popular. Further, since the SiC elements can be also operated at a high temperature of 300° C. or higher, a bonding material that bonds SiC elements to a DCB (direct copper bonding) substrate needs to have a solidus temperature of 300° C. or higher so as not to be melted during an operation.

However, since the solidus temperature of the bonding material used conventionally is lower than 300° C., this bonding material is not suitable for bonding SiC elements.

As the bonding material used to bond the power semiconductors such as SiC elements having a high heat resistance, for example, a method can be exemplified in which a metal powder containing Ag is placed on a DCB substrate and is heated while being pressed in one direction or both directions so as to densify (sinter) metal powder.

However, in that method, the metal powder needs to be heated and pressed under a high temperature condition of, for example, 200° C. to 300° C. in order to sinter the metal powder containing Ag having a high liquidus temperature.

For that reason, since the heating and pressing operations are necessary for a long time in order to bond particularly SiC elements having a large area to the DCB substrate, there is a problem that productivity of power semiconductors is hindered.

Here, as a method of efficiently mounting (bonding) SiC elements onto the DCB substrate, a soldering method using a molded solder having high solidus and liquidus temperatures is widely used.

Molded solder means solder molded into a predetermined shape such as a rectangle, a square, and a disk. SiC elements can be mounted onto the DCB substrate when the molded solder is heated while being interposed between the DCB substrate and the SiC element.

As a method of molding the molded solder, for example, there is disclosed a solder ingot production method of forming a metal film easily wetting with solder on a surface of each particle of a powder made of a material having a melting point higher than that of the solder, kneading the particles together with flux, placing the kneaded particles in the melted solder to disperse and diffuse the particles, and then cooling and solidifying the kneaded particles (JP 6-31486 A) or a foam solder production method of putting a mixture of high melting point metal particles and thermally decomposable liquid flux into melted solder, cooling the mixture to prepare a billet, and processing the billet (see JP 5245410 B2).

The solder ingot production method and the foam solder production method disclosed in JP 6-31486 A and JP 5245410 B2 relate to a technique of particularly increasing the solidus temperatures of the ingot and foam solder by dispersing and diffusing the metal powder having high solidus and liquidus temperatures in the melted solder alloy. In both techniques, flux is used for production.

For that reason, even when an element that easily volatilizes in the flux is used, there is still a risk that bubbles generated due to the volatilization of the flux or flux remain in the melted solder alloy and become voids.

Further, when the mixture of the metal powder and the flux is put into the melted solder alloy, the mixture needs to be heated until the flux element disappears. For this reason, there still remains a risk that metal powder will be eroded by the melted solder alloy in the meantime. Since the rate of erosion by the melted solder alloy changes depending on the type and property of the metal that constitutes the metal powder, there is a large risk that the metal powder eroded by the melted solder alloy is miniaturized and disappears particularly when the metal powder made of Cu easily dispersed in the solder alloy is used.

SUMMARY

According to a first aspect of the embodiment, molded solder includes first metal powder and second metal powder. The first metal powder has a first solidus temperature and a first liquidus temperature and includes an alloy containing a plurality of metal elements. The second metal powder has a melting temperature or a second solidus temperature and a second liquidus temperature and includes single metal element or an alloy containing a plurality of metal elements. The melting temperature and the second liquidus temperature are higher than the first liquidus temperature. The molded solder is so constructed that a mixture of the first metal powder and the second metal powder are press-molded. The molded solder is so constructed that a first solidus temperature of a solder becomes higher when the molded solder becomes the solder after the first metal powder has been melted by heating the molded solder at a temperature equal to or higher than the first liquidus temperature.

According to a second aspect of the embodiment, a molded solder production method includes preparing a mixture of a first metal powder and a second metal powder by mixing and dispersing the first metal powder and the second metal powder; storing the mixture in a press-molding container; and pressing the press-molding container storing the mixture. The first metal powder has a first solidus temperature and a first liquidus temperature. The first metal powder includes an alloy containing a plurality of metal elements. The second metal powder has a melting temperature or a second solidus temperature and a second liquidus temperature. The second metal powder includes single metal element or an alloy containing a plurality of metal elements. The melting temperature and the second liquidus temperature are higher than the first liquidus temperature. The first solidus temperature of the molded solder becomes higher after the first metal powder has been melted by heating the molded solder at a temperature equal to or higher than the first liquidus temperature.

DETAILED DESCRIPTION

Figure 1:
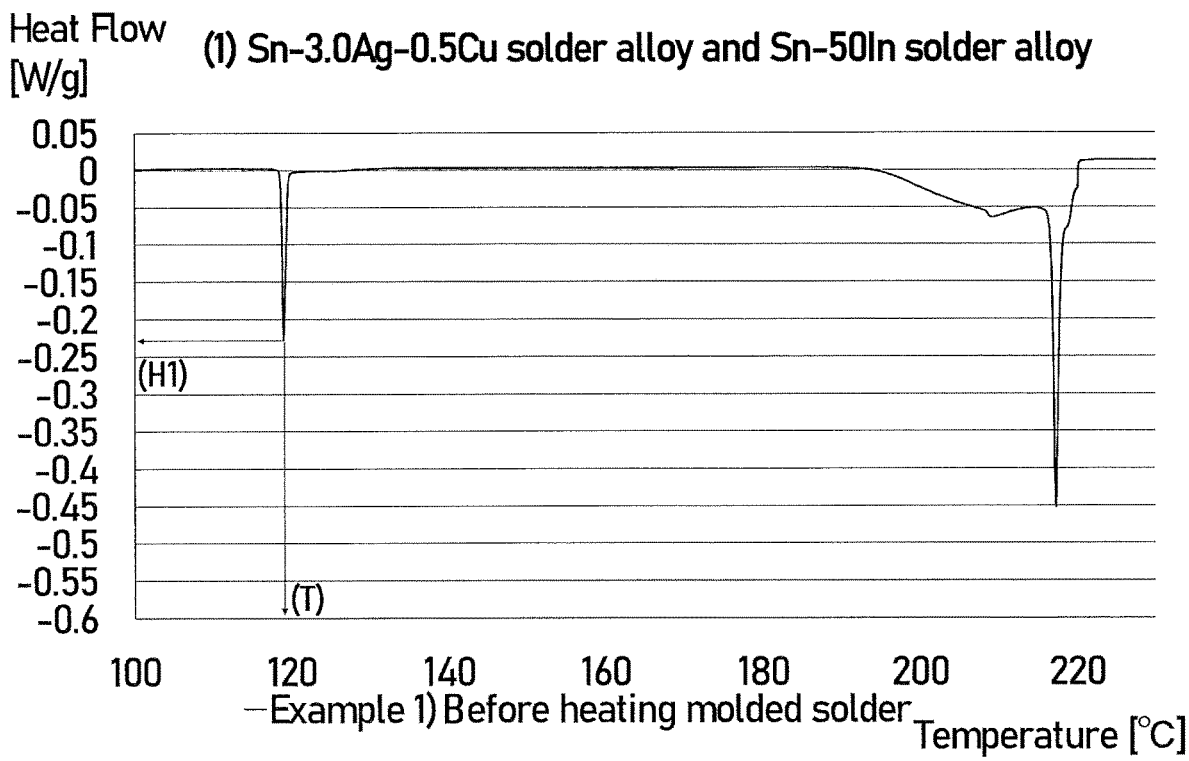
FIG. 1 is a DSC chart obtained by differential scanning calorimetry before heating molded solder in which a metal powder made of a Sn-3.0Ag-0.5Cu solder alloy and a metal powder made of a Sn-50In solder alloy are mixed at a ratio of 80:20.
Figure 2:
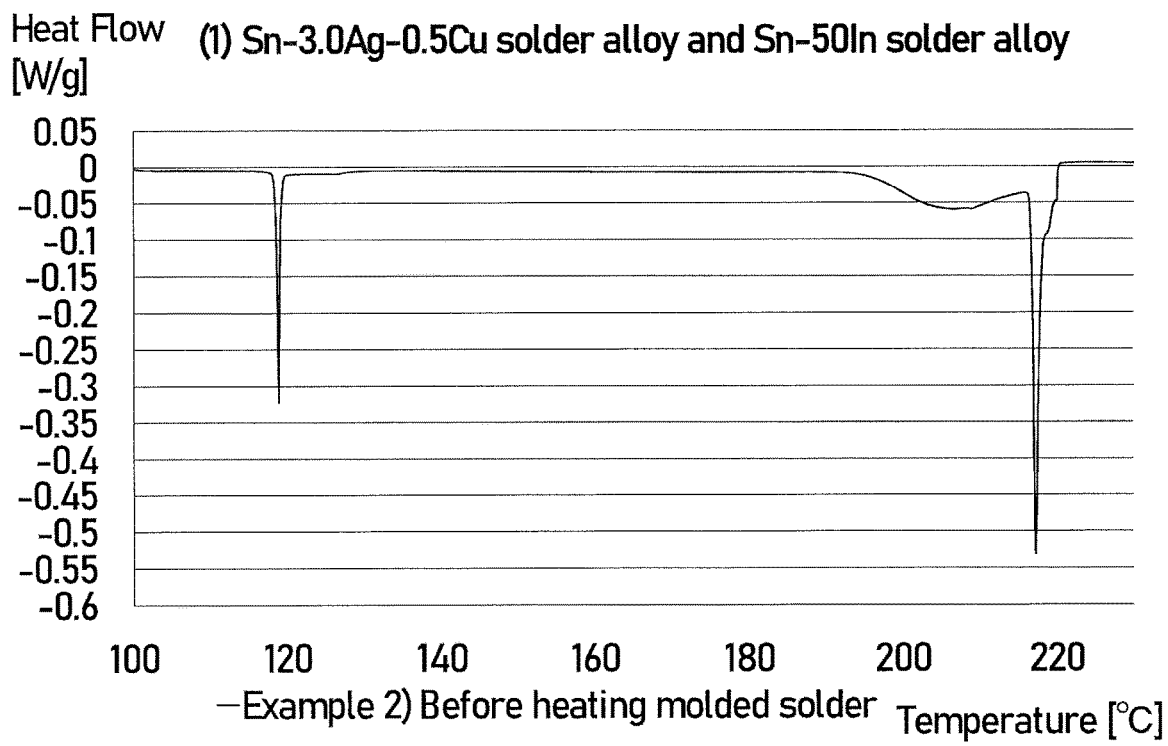
FIG. 2 is a DSC chart obtained by differential scanning calorimetry before heating molded solder in which a metal powder made of a Sn-3.0Ag-0.5Cu solder alloy and a metal powder made of a Sn-50In solder alloy are mixed at a ratio of 70:30.
Figure 3:
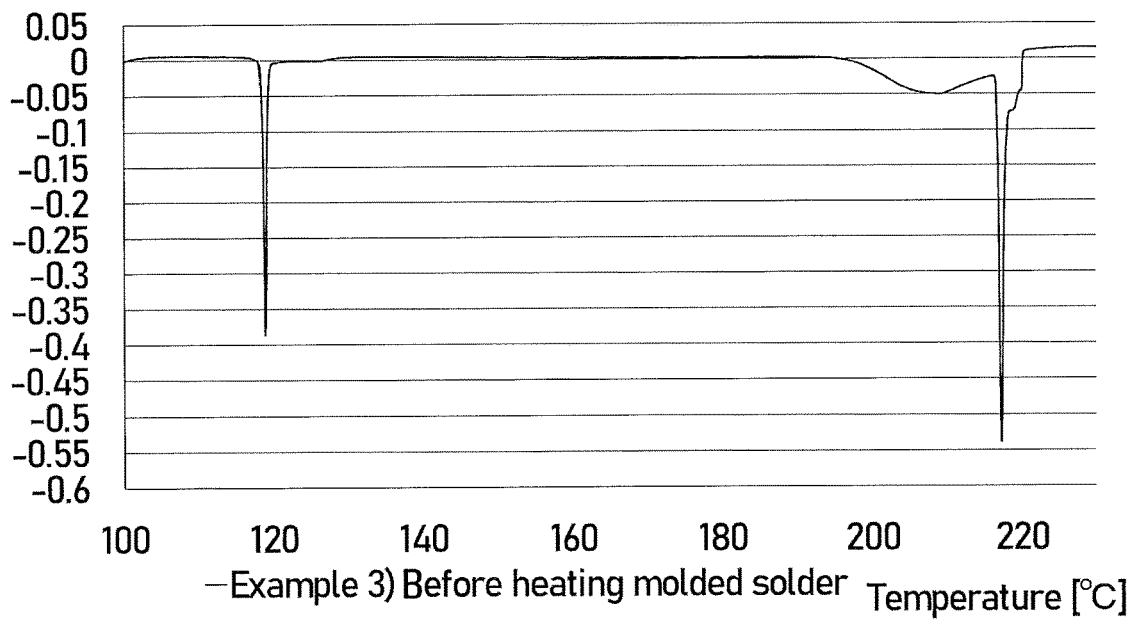
FIG. 3 is a DSC chart obtained by differential scanning calorimetry before heating molded solder in which a metal powder made of a Sn-3.0Ag-0.5Cu solder alloy and a metal powder made of a Sn-50In solder alloy are mixed at a ratio of 60:40.
Figure 4:
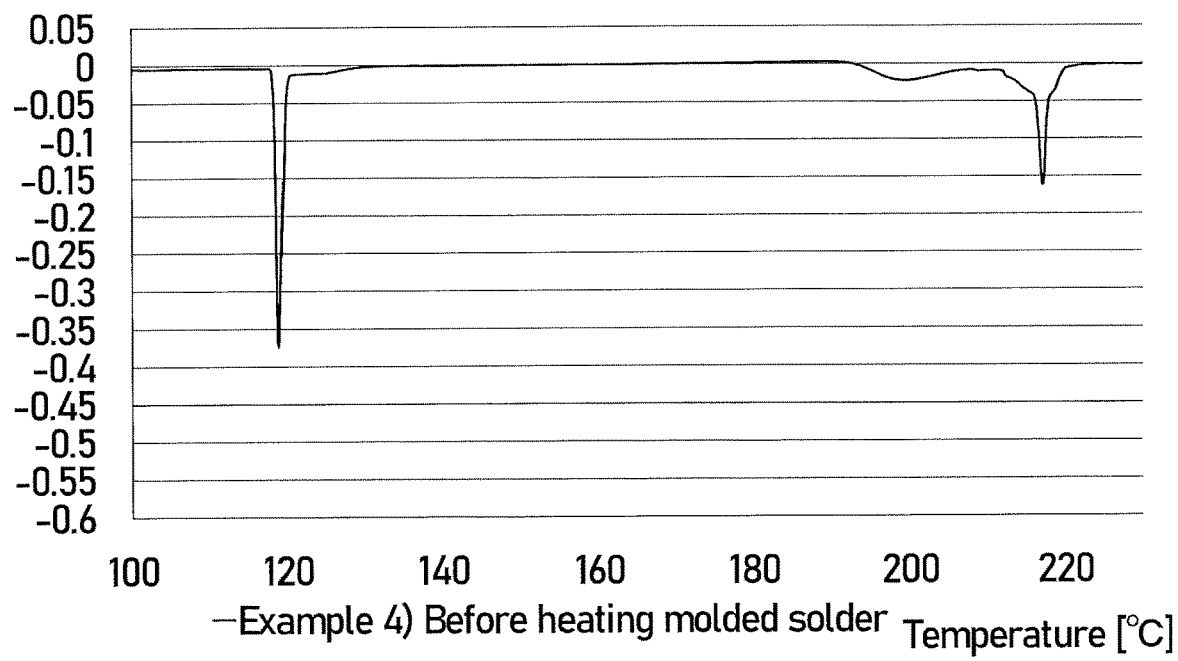
FIG. 4 is a DSC chart obtained by differential scanning calorimetry before heating molded solder in which a metal powder made of a Sn-3.0Ag-0.5Cu solder alloy and a metal powder made of a Sn-50In solder alloy are mixed at a ratio of 50:50.

Hereinafter, an embodiment of a molded solder and a molded solder production method of the invention will be described in detail.

Of course, the invention is not limited to the embodiment.

<Plural Types of Metal Powders>

Plural types of metal powders used to produce molded solder of the invention are preferably made of an alloy in which at least one of them contains a plurality of metal elements.

As alloy elements constituting such an alloy, for example, Sn, Ag, Cu, Bi, Zn, In, Ga, Sb, Au, Pd, Ge, Ni, Cr, Al, P, and In are exemplified and an alloy obtained by combining a plurality of these alloy elements can be used.

Among these, an alloy containing Sn, particularly, an alloy containing 40% by mass or more of Sn is preferably used. In addition, the content of Sn is more preferably 42% by mass or more and 97% by mass or less.

Further, as the alloy, an alloy having a solidus temperature of 250° C. or lower is preferably used.

The molded solder of the embodiment is molded by pressing as will be described later. That is, since the molding does not require heating, in the molded solder before soldering, the plural types of metal powders are not melted and dispersed and the melting temperature change is not generated.

For that reason, when the bonding is performed by using the molded solder of the embodiment, the metal powder made of the alloy contained therein can be also sufficiently melted, for example, at a heating temperature during bonding using a general lead-free solder having a peak temperature of about 250° C. Thus, the molded solder of the embodiment can bond power semiconductors such as SiC elements onto a DCB substrate also at about 250° C.

The average particle diameter of the metal powder made of the alloy is preferably 1 μm or more and 30 μm or less. The average particle diameter is more preferably 2 μm or more and 25 μm or less and is particularly preferably 2 μm or more and 8 μm or less.

Further, each of the liquidus temperatures of the plural types of metal powders preferably has a temperature difference of 50° C. or higher. That is, the liquidus temperature of each metal powder preferably has a temperature difference of 50° C. or higher with respect to the liquidus temperatures of other metal powders.

In the molded solder of the embodiment molded by using such a metal powder, the heating temperature during soldering is easily adjusted. Further, the molded solder can cause a melting temperature change accompanying heating at the time of soldering which will be described later.

Further, one of the plural types of metal powders is preferably a Cu metal powder. Cu has a high melting temperature of 1085° C. For that reason, it is possible to further suppress the remelting of the molded solder (the solder joint) after soldering by the melting temperature change of the molded solder due to the heating during soldering which will be described later.

For that reason, such a molded solder can be suitably used to bond power semiconductors such as SiC elements.

In the embodiment, a content ratio of the Cu metal powder contained in the mixture of the plural types of metal powders is preferably 40% by mass or more and 80% by mass or less. The content ratio is more preferably 40% by mass or more and 60% by mass or less and particularly preferably 40% by mass or more and 50% by mass or less.

When the content ratio of the Cu metal powder is set to this range, it is possible to more suppress the remelting of the molded solder (the solder joint) after soldering, to satisfactorily bond the DCB substrate to the power semiconductor, and to improve thermal conductivity.

Additionally, in the case of the molded solder using a metal powder made of a Sn-50In solder alloy and a Cu metal powder as the plural types of metal powders, the content ratio of the metal powder made of the Sn-50In solder alloy and the Cu metal powder is preferably set such that the metal powder made of Sn-50In solder alloy: Cu metal powder=30:70 to 60:40.

The average particle diameter of the Cu metal powder is preferably 1 μm or more and 30 μm or less. The average particle diameter is more preferably 1 μm or more and 10 μm or less and particularly preferably 1 μm or more and 5 μm or less.

<Molded Solder Production (Molding)>

The molded solder of the embodiment can be produced by preparing a mixture of the plural types of metal powders by mixing and dispersing the plural types of metal powders, storing the mixture in a press-molding container, and pressing the mixture of the metal powder and the press-molding container.

As a method of preparing the mixture of the plural types of metal powders by mixing and dispersing the plural types of metal powders, for example, a method of mixing and dispersing the plural types of metal powders using a mixer, a stirrer, and a sieve are exemplified. In addition, if the plural types of metal powders can be mixed and dispersed, any method may be used.

Further, it is preferable to pass the plural types of metal powders through a sieve or the like to remove aggregates and the like before preparing the mixture of the plural types of metal powders.

As the press-molding container that stores the mixture of the metal powders, a container capable of press-molding a powder may be used. For example, a powder holding ring made of aluminum or the like is preferably used.

Further, as a method of pressing the mixture of the plural types of metal powders and the press-molding container, any method may be used if the powder can be press-molded (solidified). For example, the method can be performed using a briquette machine. In addition, it is preferable that the pressing is performed at a room temperature.

Further, the above-described pressing condition may be a condition that the mixture of the plural types of metal powders can be molded (solidified) and can be appropriately adjusted by the metal constituting the plural types of metal powders. For example, a pressing condition of 200 kN or more can be used.

Additionally, the thickness of the molded solder of the embodiment can be appropriately adjusted depending on the DCB substrate to be used, the type of element to be mounted, and the type of the plural types of metal powder used for forming the molded solder, but is preferably 50 μm or more and 1,000 μm or less.

<Molded Solder Melting Temperature Change>

The molded solder of the embodiment (which includes the molded solder produced by the molded solder production method of the embodiment and is the same as below) can have the melting temperature change by heating the molded solder at a temperature equal to or higher than the lowest liquidus temperature of the liquidus temperatures of the plural types of metal powders during soldering.

That is, at least the metal powder having the lowest liquidus temperature of the plural types of metal powders can be melted by heating during soldering using the molded solder of the embodiment. Then, the metal powder having a higher liquidus temperature is dispersed in the melted metal during soldering (heating) so that an intermetallic compound having a solidus temperature higher than that of the metal melted in the molded solder can be formed. Then, the melting temperature change of the molded solder (after soldering) can be generated by the formation of the intermetallic compound.

Here, in the present specification, a "change in melting temperature (melting temperature change)" indicates a state described later at the solidus temperature and the liquidus temperature of the molded solder measured according to the condition specified in JIS standard Z3198-1, "Melting Temperature Range Measurement Method".

That is, when a percentage of a metal powder having the lowest solidus temperature of the plural types of metal powders or an alloy powder containing a plurality of metal elements that is melted (a percentage of the metal powder or the alloy powder containing the plurality of metal elements that is melted, in the metal powder or the alloy powder containing the plurality of metal elements) at a temperature (T) indicating an initial endothermic peak of differential scanning calorimetry before heating molded solder at a temperature equal to or higher than the lowest liquidus temperature of the liquidus temperatures of the plural types of metal powders contained in the molded solder of the embodiment is denoted by X, a temperature in which the ratio of the melted alloy powder containing the plurality of metal elements or the melted metal powder having the lowest solidus temperature of the plural types of metal powders in the molded solder heated at a temperature equal to or higher than the lowest liquidus temperature of the liquidus temperatures of the plural types of metal powders becomes X becomes equal to or higher than the temperature (T).

Since the molded solder of the embodiment does not require heating during press-molding as described above, in the molded solder before soldering, the plural types of metal powders are not melted and dispersed yet and the melting temperature change is not generated.

For that reason, when the soldering is performed by using the molded solder of the embodiment, the metal powder made of the alloy contained therein can be also sufficiently melted, for example, at a heating temperature during bonding using a general lead-free solder having a peak temperature of about 250° C. Thus, the molded solder of the embodiment can bond power semiconductors such as SiC elements onto the DCB substrate even in the heating of about 250° C.

Further, the molded solder of the embodiment can have the melting temperature change due to the heating during soldering as described above. For that reason, since the molded solder is not easily remelted at the heating temperature during soldering, the highly reliable solder joint can be provided.

Further, in the molded solder of the embodiment, an absolute value (H1') of a heat flow (H1) at the temperature (T) indicating the initial endothermic peak of the differential scanning calorimetry before heating the molded solder at a temperature equal to or higher than the lowest liquidus temperature of the liquidus temperatures of the plural types of metal powders and an absolute value (H2') of a heat flow (H2) at the temperature (T) of the differential scanning calorimetry after heating the molded solder during soldering preferably satisfy the following relationship.

$$(H2')/(H1') \leq 0.5$$

Further, (H1') and (H2') more preferably satisfy the following formula (1).

$$(H2')/(H1') \leq 0.2 \tag{1}$$

The differential scanning calorimetry of the molded solder can be measured in the condition specified in JIS standard Z3198-1, "Melting Temperature Range Measurement Method".

Since the molded solder is further hardly remelted at the heating temperature (the temperature equal to or higher than the lowest liquidus temperature) during soldering, the highly reliable solder joint can be provided.

<Solder Bonding by Molded Solder>

An example of a soldering method using the molded solder of the embodiment is as below.

First, semiconductor elements such as Si elements and SiC elements are prepared, flux is applied onto the DCB substrate, and the molded solder of the embodiment is placed thereon. Next, flux is further applied to the surface of the molded solder (the surface not contacting the DCB substrate), Si elements, SiC elements, or the like are placed thereon, and these are heated at a temperature equal to or higher than the lowest liquidus temperature of the liquidus temperatures of the plural types of metal powders used for forming the molded solder, so that Si elements, SiC elements, and the like are soldered onto the DCB substrate.

Additionally, flux may be applied to both surfaces of the molded solder of the embodiment in advance.

The heating temperature during soldering can be appropriately adjusted depending on the DCB substrate, the type of element to be mounted, and the type of the plural types of metal powders used for forming the molded solder, but is preferably 150° C. or higher.

Since the molded solder does not require heating during press-molding as described above, in the molded solder before soldering, the plural types of metal powders are not melted and dispersed yet and the melting temperature change is not generated.

For that reason, since the metal powder made of the alloy contained in the molded solder can be also sufficiently melted, for example, at a heating temperature during bonding using a general lead-free solder having a peak temperature of about 250° C. when soldering is performed by the molded solder, the power semiconductor can be soldered onto the DCB substrate even at the heating of about 250° C.

Further, as described above, a melting temperature change can be caused by heating the molded solder during soldering. For that reason, since the molded solder is not easily remelted at the heating temperature during soldering, the highly reliable solder joint can be provided.

In addition, as the flux used for the above-described soldering method, the flux containing a base resin, a solvent, an activator, and a thixotropic agent is exemplified. The types and blending amounts of these elements can be adjusted as appropriate.

Further, the molded solder of the embodiment can be bonded by using, for example, formic acid reflow in a reducing atmosphere.

In order to describe that powders made of various metals can be used as the plural types of metal powders and the effect can be produced even if the content ratio of each metal powder is changed, the molded solder of the embodiment will be described below as an example.

(1) Sn-3.0Ag-0.5Cu Solder Alloy and Sn-50In Solder Alloy

A metal powder (a) made of a Sn-3.0Ag-0.5Cu solder alloy and a metal powder (b) made of a Sn-50In solder alloy are mixed and dispersed in a sieve so as to have the following ratios. Thus, a mixture of metal powders was produced.

Example 1) metal powder (a): metal powder (b)=80:20
Example 2) metal powder (a): metal powder (b)=70:30
Example 3) metal powder (a): metal powder (b)=60:40
Example 4) metal powder (a): metal powder (b)=50:50

Next, an aluminum ring (thickness: 1 mm, outer diameter: 34 mm, inner diameter: 26 mm) was placed on a pressure plate (lower plate) of the briquette machine and each mixture was filled in the aluminum ring. Then, a pressure plate (upper plate) was placed on each aluminum ring and this was pressed with a weight of about 330 kN to produce each molded solder. In addition, the thickness of each produced molded solder is as follows.

Example 1) 730 μm
Example 2) 700 μm
Example 3) 680 μm
Example 4) 670 μm

The molded solders of Example 1) to Example 4) were subjected to differential scanning calorimetry in the following condition. The results are shown in FIGS. 1 to 4.

As shown in FIGS. 1 to 4, all molded solders of Example 1) to Example 4) showed endothermic peaks in the vicinity of 118° C. and 217° C.

Differential Scanning Calorimeter

Product Name: MDSC Q-2000 manufactured by TA Instruments
Temperature Rise Rate: 2° C./min
Atmosphere: $N_2$ 50 ml/min
Measurement Range: 100° C. to 230° C.

Figure 32:
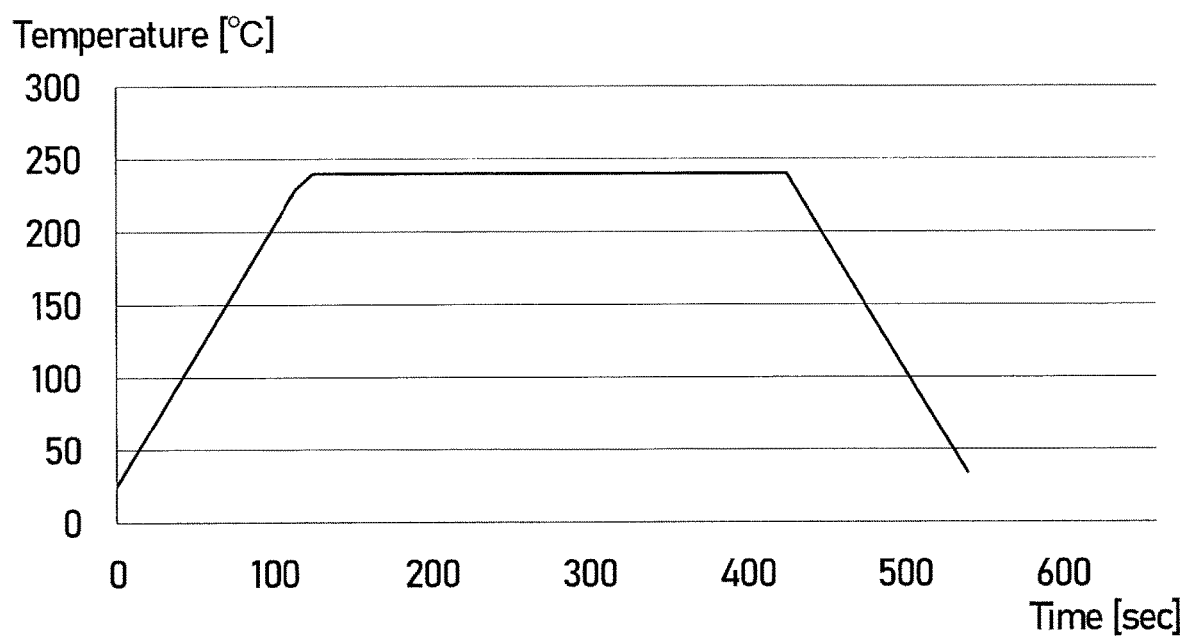
FIG. 32 is a temperature profile showing a temperature condition during reflow of molded solder using a metal powder made of a Sn-3.0Ag-0.5Cu solder alloy and a metal powder made of a Sn-50In solder alloy, molded solder using a metal powder made of a Sn-3.0Ag-0.5Cu solder alloy and a metal powder made of a Sn-58Bi solder alloy, and molded solder using a metal powder made of a Sn-3.0Ag-0.5Cu solder alloy and a metal powder made of Cu.

Next, each of the molded solders of Example 1) to Example 4) was heated at 240° C. in a temperature profile condition shown in FIG. 32 for 5 minutes by a reflow device in the condition of the oxygen concentration of 100 ppm and each of the heated molded solders was subjected to differential scanning calorimetry in the above-described condition. The results are shown in FIGS. 5 to 8.

Figure 9:
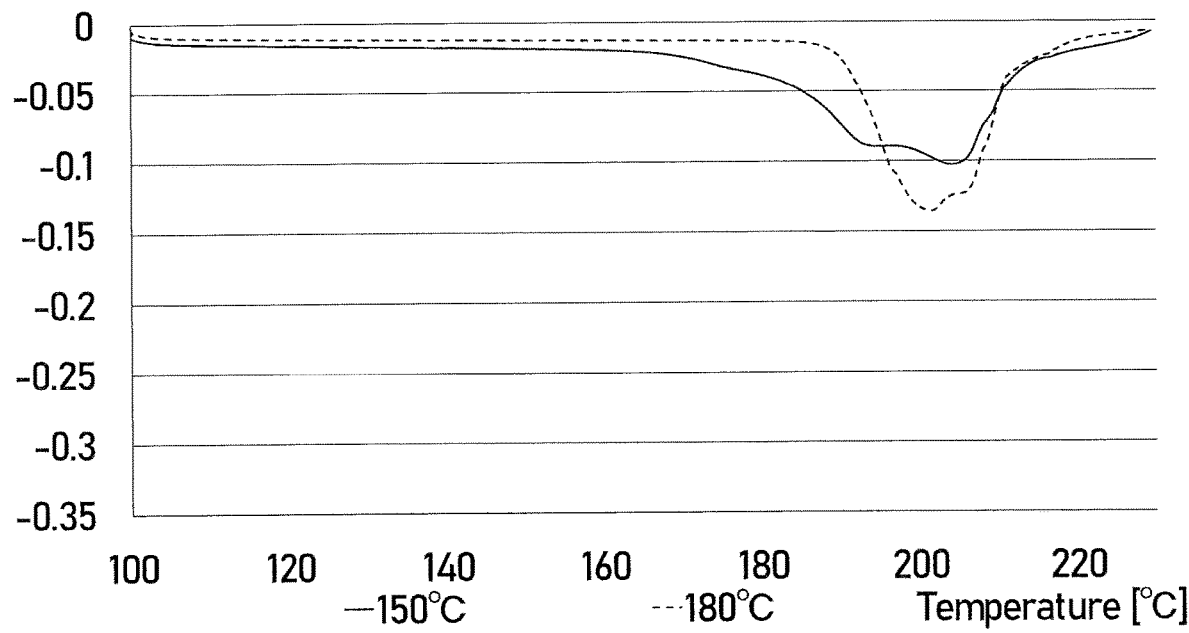
FIG. 9 is a DSC chart (1) at each heating temperature obtained by differential scanning calorimetry after heating molded solder in which a metal powder made of a Sn-3.0Ag-0.5Cu solder alloy and a metal powder made of a Sn-50In solder alloy are mixed at a ratio of 80:20.
Figure 10:
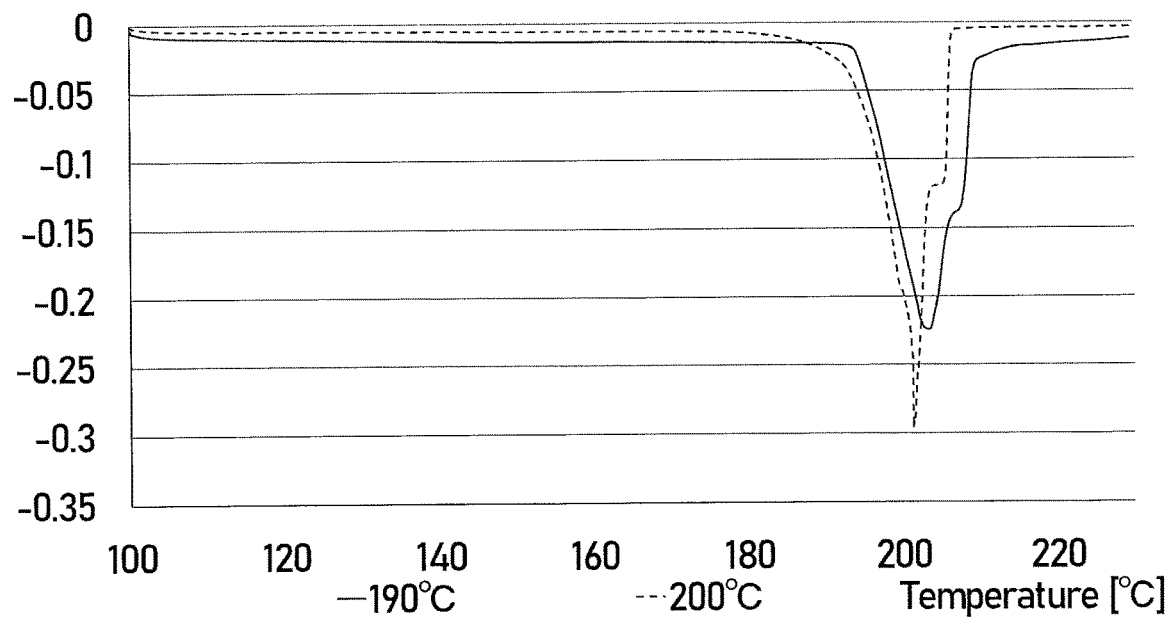
FIG. 10 is a DSC chart (2) at each heating temperature obtained by differential scanning calorimetry after heating molded solder in which a metal powder made of a Sn-3.0Ag-0.5Cu solder alloy and a metal powder made of a Sn-50In solder alloy are mixed at a ratio of 80:20.
Figure 11:
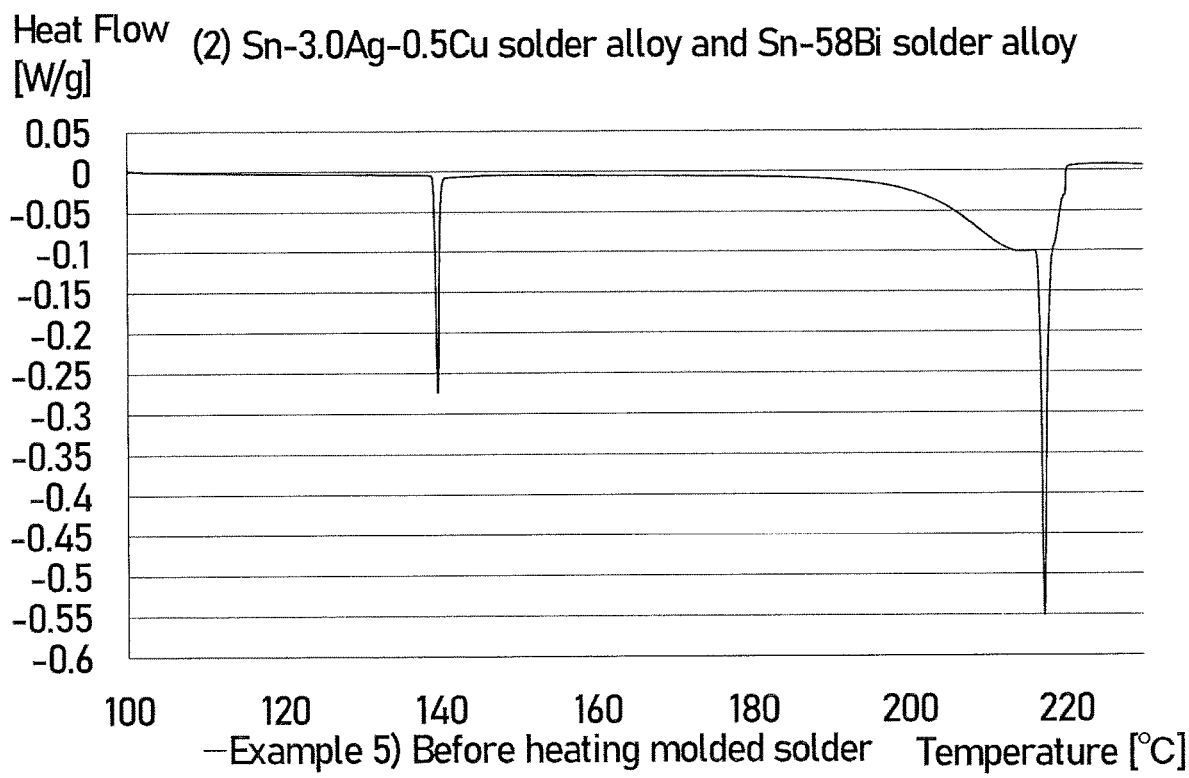
FIG. 11 is a DSC chart obtained by differential scanning calorimetry before heating molded solder in which a metal powder made of a Sn-3.0Ag-0.5Cu solder alloy and a metal powder made of a Sn-58Bi solder alloy are mixed at a ratio of 90:10.
Figure 12:
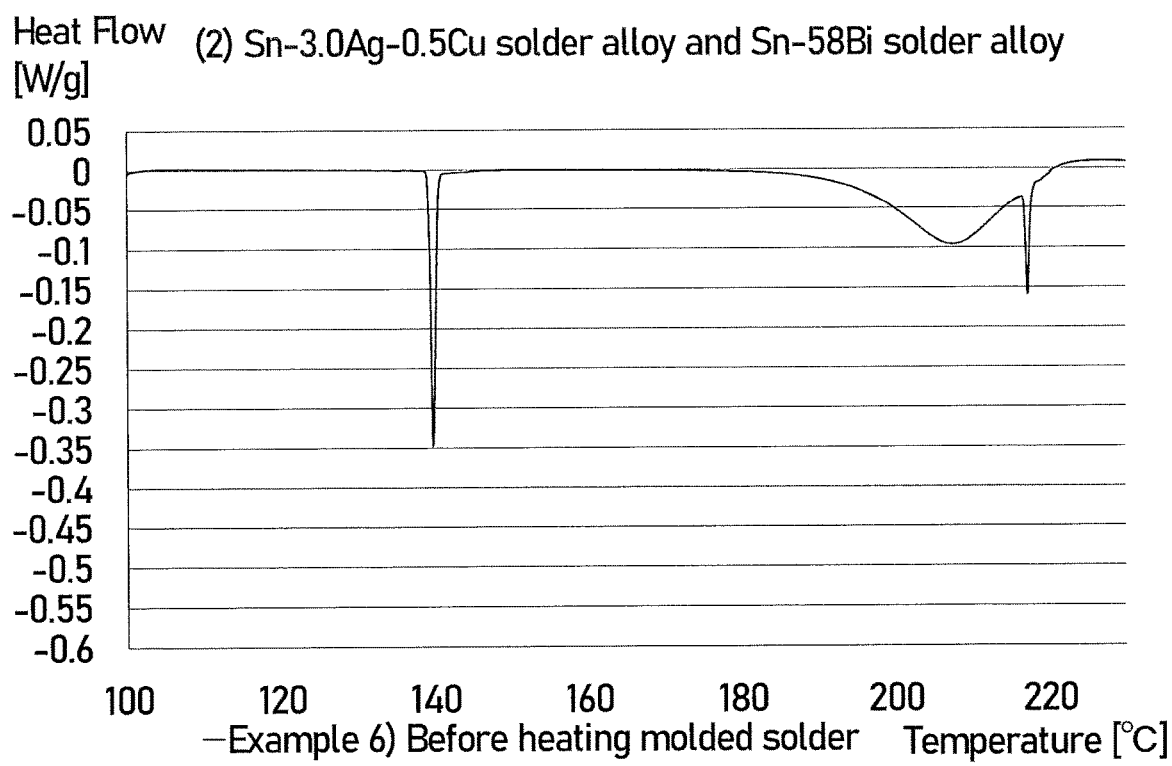
FIG. 12 is a DSC chart obtained by differential scanning calorimetry before heating molded solder in which a metal powder made of a Sn-3.0Ag-0.5Cu solder alloy and a metal powder made of a Sn-58Bi solder alloy are mixed at a ratio of 80:20.
Figure 13:
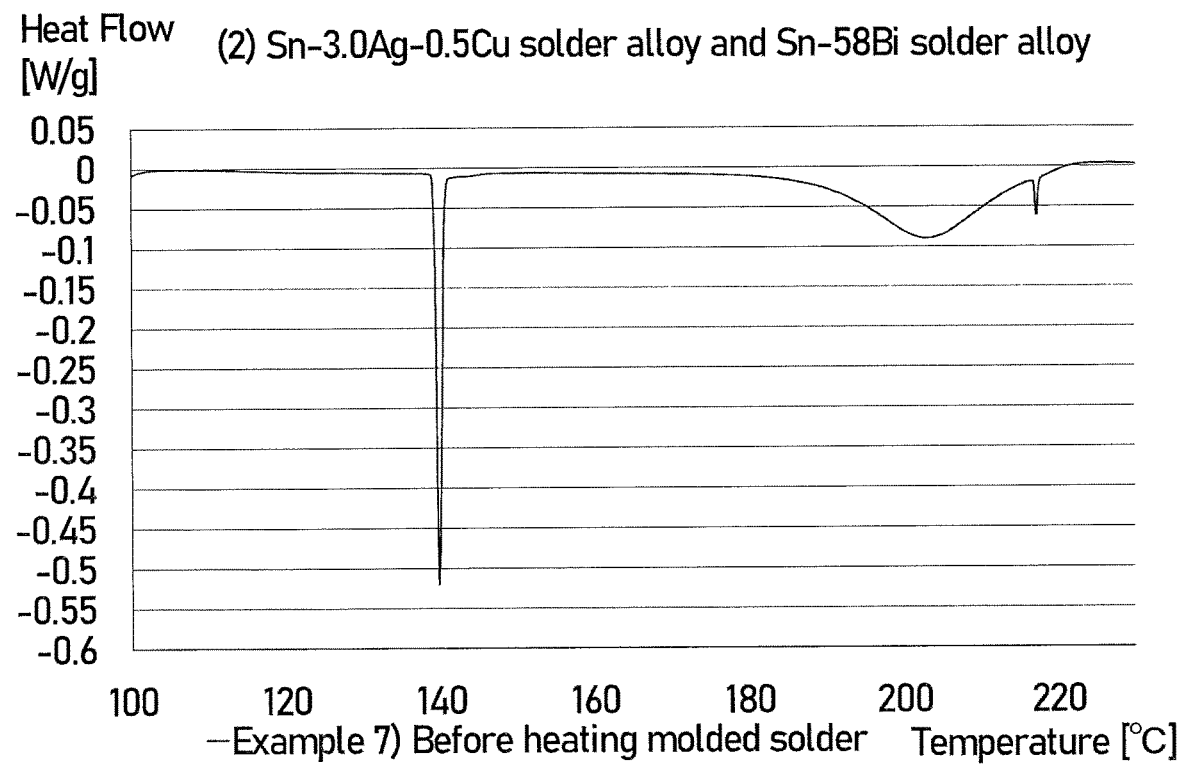
FIG. 13 is a DSC chart obtained by differential scanning calorimetry before heating molded solder in which a metal powder made of a Sn-3.0Ag-0.5Cu solder alloy and a metal powder made of a Sn-58Bi solder alloy are mixed at a ratio of 70:30.
Figure 14:
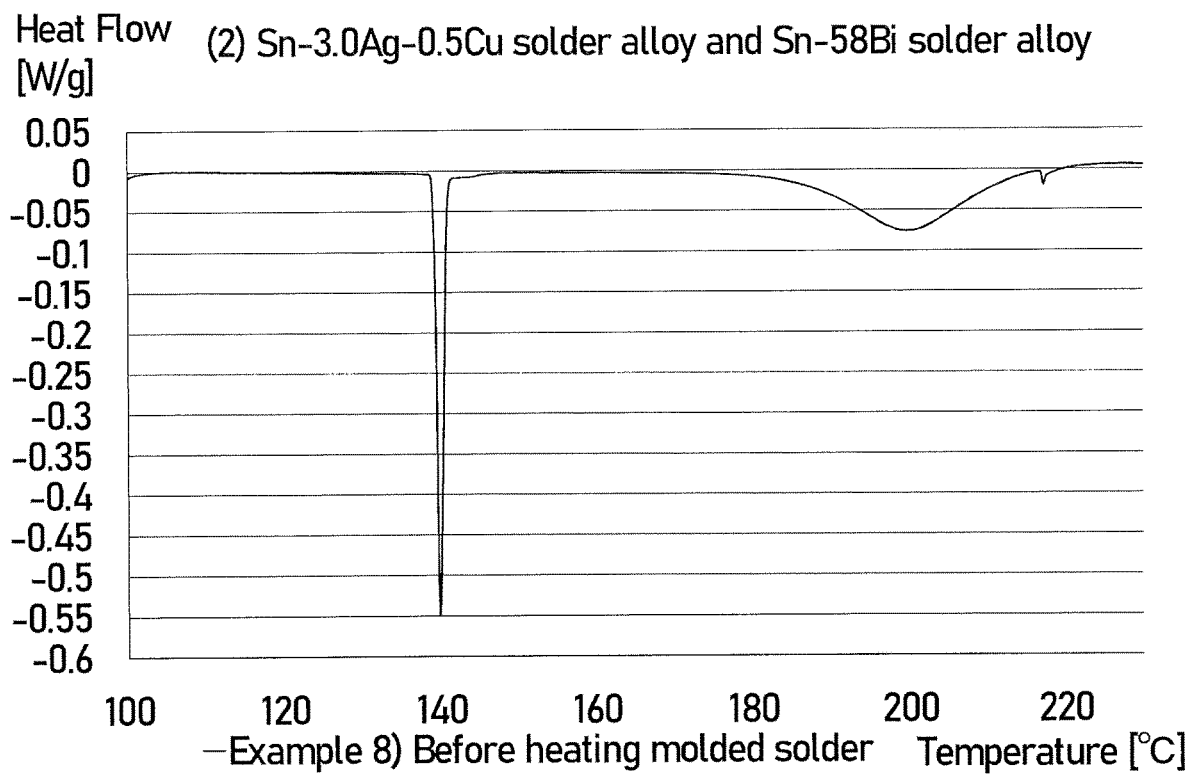
FIG. 14 is a DSC chart obtained by differential scanning calorimetry before heating molded solder in which a metal powder made of a Sn-3.0Ag-0.5Cu solder alloy and a metal powder made of a Sn-58Bi solder alloy are mixed at a ratio of 60:40.
Figure 15:
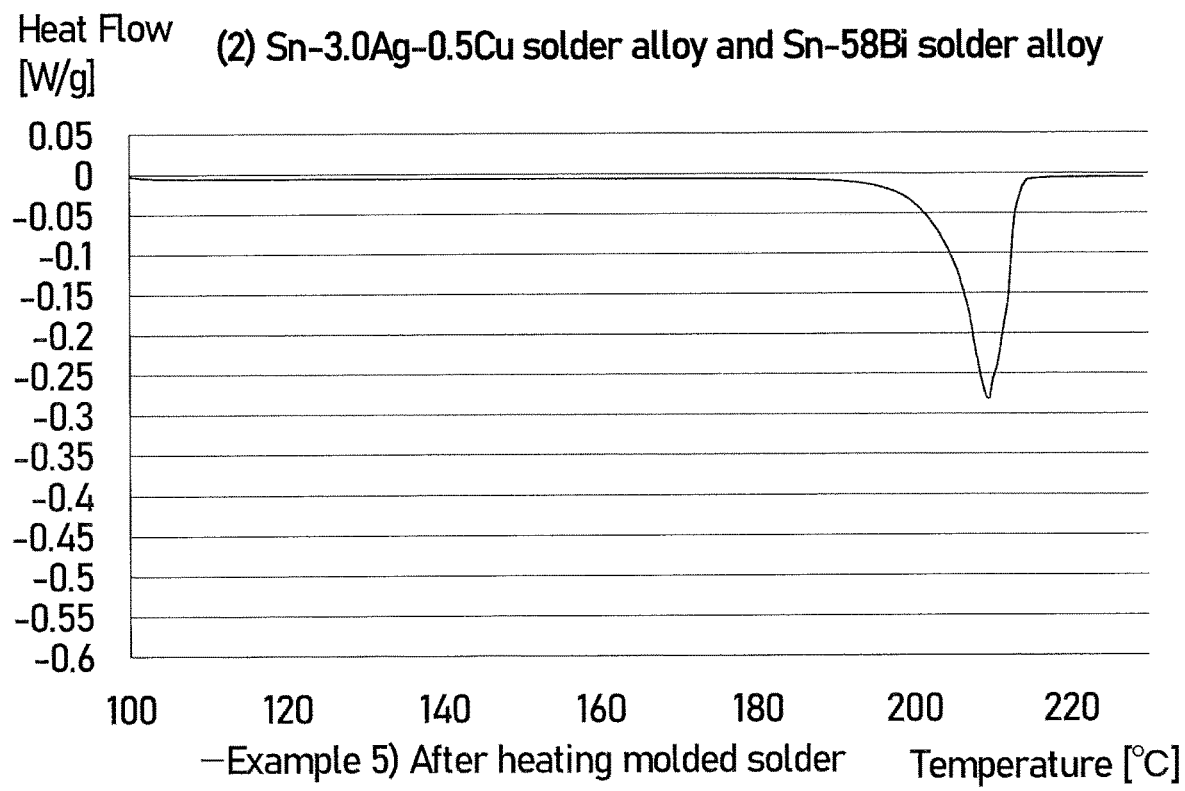
FIG. 15 is a DSC chart obtained by differential scanning calorimetry after heating molded solder in which a metal powder made of a Sn-3.0Ag-0.5Cu solder alloy and a metal powder made of a Sn-58Bi solder alloy are mixed at a ratio of 90:10.
Figure 16:
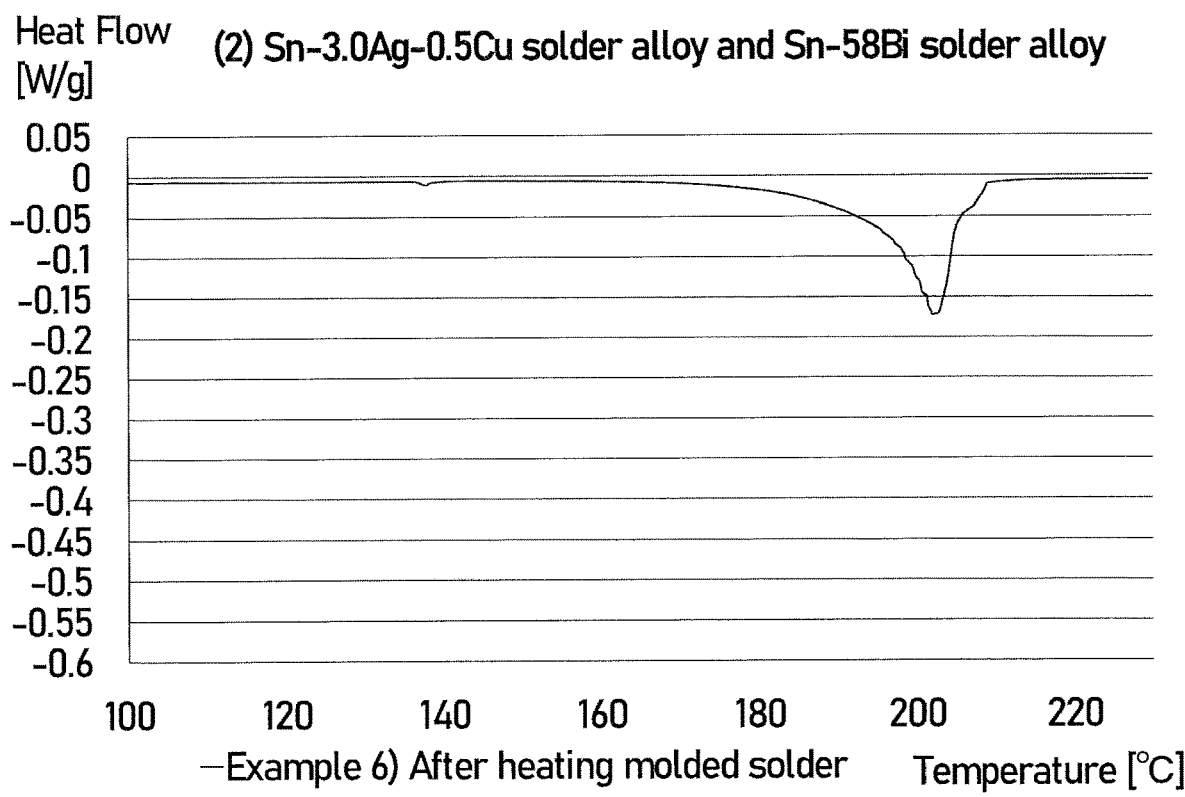
FIG. 16 is a DSC chart obtained by differential scanning calorimetry after heating molded solder in which a metal powder made of a Sn-3.0Ag-0.5Cu solder alloy and a metal powder made of a Sn-58Bi solder alloy are mixed at a ratio of 80:20.
Figure 17:
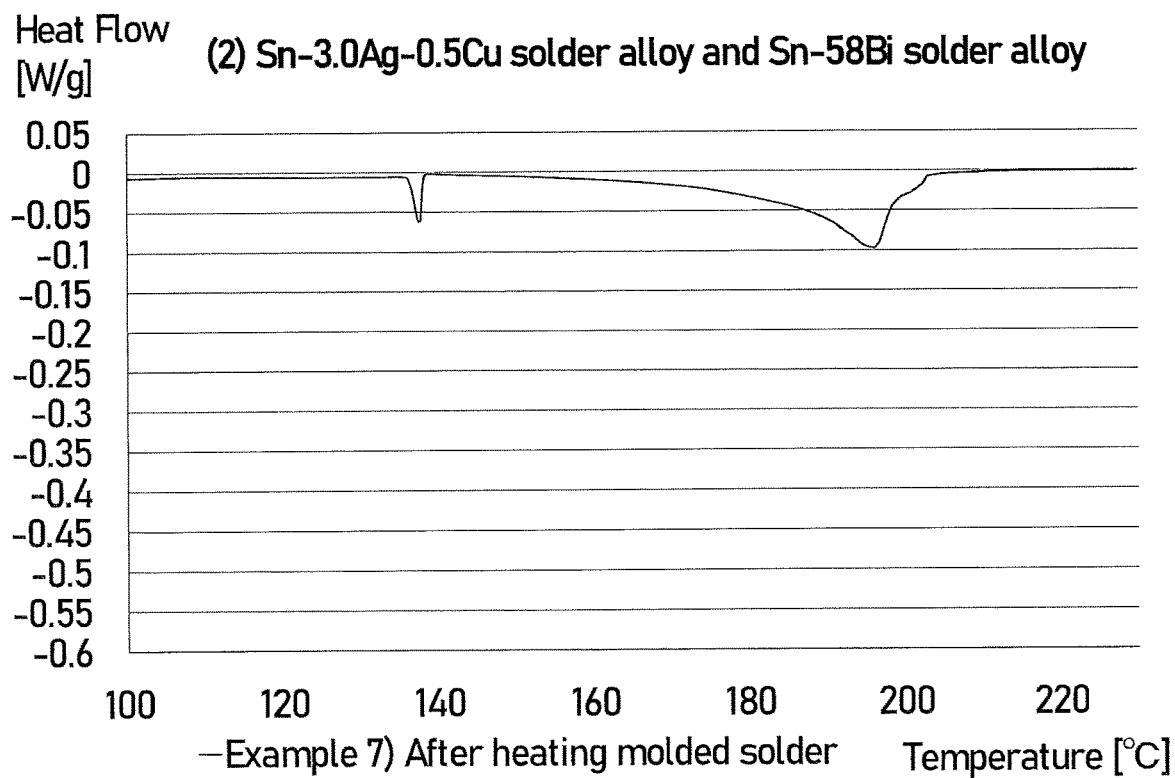
FIG. 17 is a DSC chart obtained by differential scanning calorimetry after heating molded solder in which a metal powder made of a Sn-3.0Ag-0.5Cu solder alloy and a metal powder made of a Sn-58Bi solder alloy are mixed at a ratio of 70:30.
Figure 18:
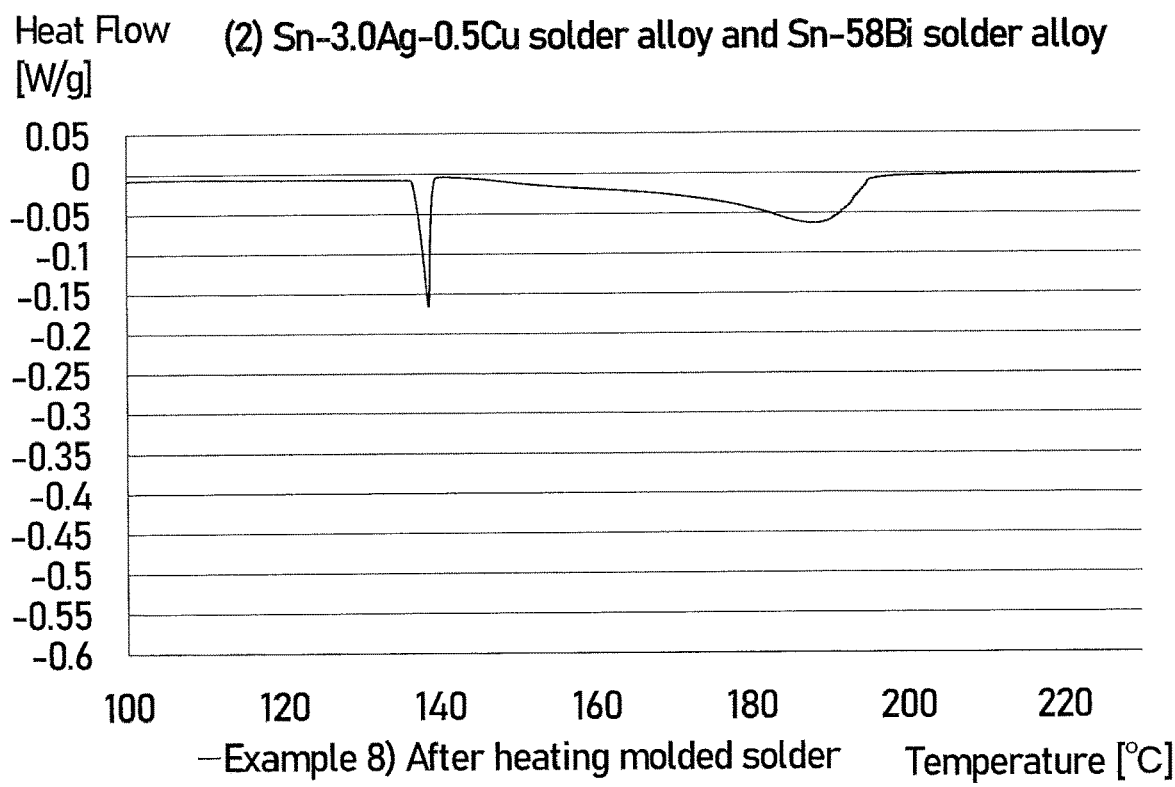
FIG. 18 is a DSC chart obtained by differential scanning calorimetry after heating molded solder in which a metal powder made of a Sn-3.0Ag-0.5Cu solder alloy and a metal powder made of a Sn-58Bi solder alloy are mixed at a ratio of 60:40.

Further, the molded solder of Example 1) was heated for 5 minutes in the same condition as the profile condition shown in FIG. 32 except that the peak temperature was 150° C., 180° C., 190° C., and 200° C. in the condition of the oxygen concentration of 100 ppm and was subjected to differential scanning calorimetry in the above-described condition. The results are shown in FIGS. 9 and 10.

The molded solders of Example 1) to Example 4) are molded by using a metal powder (a) made of a Sn-3.0Ag-0.5Cu solder alloy and having a liquidus temperature of 219° C. and a metal powder (b) made of a Sn-50In solder alloy and having a liquidus temperature of 120° C.

Then, since the molded solders are not heated during press-molding, both metal powders (a) and (b) are not melted and diffused and the melting temperature change is not generated. For that reason, in these molded solders, at least the metal powder (b) can sufficiently melt at a heating temperature of 120° C. or higher.

Further, as shown in FIGS. 1 to 8, the melting temperature change is generated in the molded solders of Example 1) to Example 4) due to the heating at the lowest liquidus temperature of the metal powders (a) and (b), that is, the liquidus temperature (120° C.) or higher of the metal powder (b).

That is, in the molded solders of Example 1) to Example 4), the metal powder (a) is dispersed in the metal powder (b) melted by heating so that an intermetallic compound having a solidus temperature higher than that of the Sn-50In solder alloy is produced in each molded solder. Accordingly, the melting temperature change can be generated in each molded solder after heating.

Particularly in the molded solder of Example 1), the endothermic peak generated between the solidus temperature (118° C.) and the liquidus temperature of the Sn-50In solder alloy before heating almost disappeared.

In this way, since the molded solders of Example 1) to Example 4), particularly, the molded solders of Example 1) and Example 2) are not easily remelted at 118° C. corresponding to the solidus temperature of Sn-50In, the highly reliable solder joint can be provided.

Further, in the molded solders of Example 1) to Example 4), when a temperature indicating an initial endothermic peak of the differential scanning calorimetry before heating the molded solder is indicated by (T), an absolute value of a heat flow (H1) at the temperature (T) is indicated by (H1'), and an absolute value of a heat flow (H2) at the temperature (T) in the differential scanning calorimetry after heating the molded solder is indicated by (H2'), the numerical values of the molded solders (H2')/(H1') of Example 1) to Example 4) are as below. Additionally, (T), (H1'), (H2'), and (H2')/(H1') are rounded to the fourth decimal place.

Figure 5:
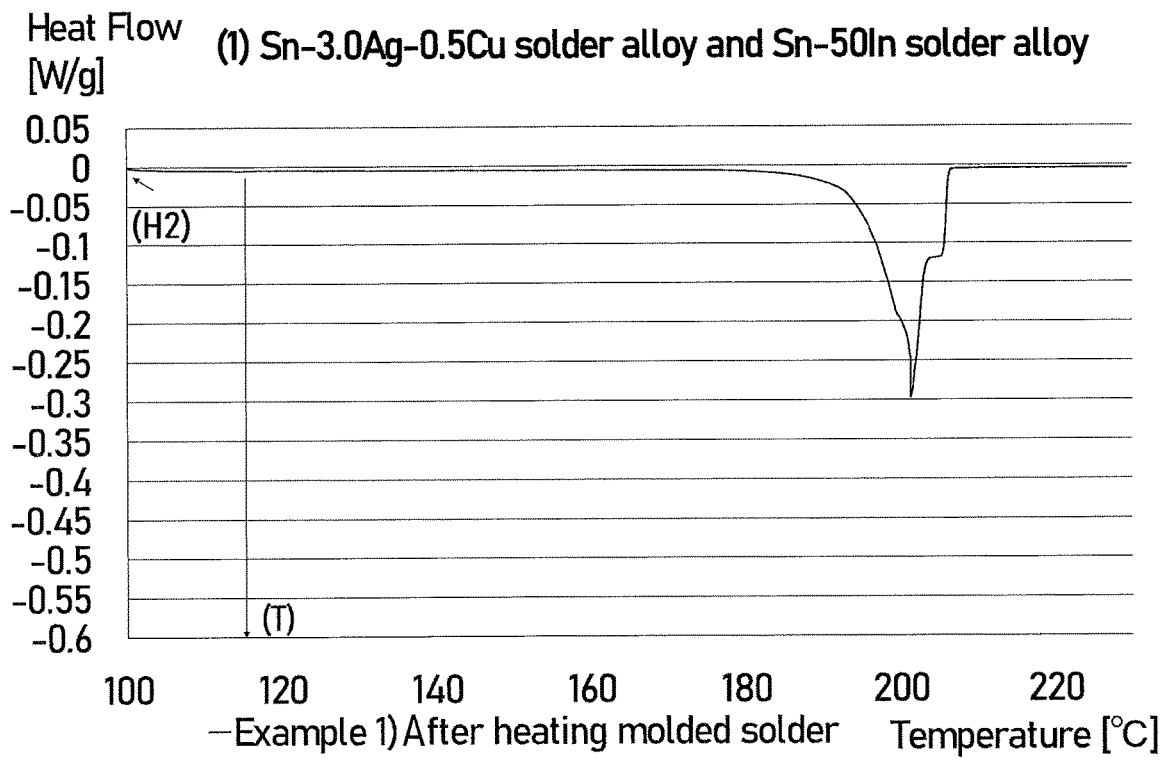
FIG. 5 is a DSC chart obtained by differential scanning calorimetry after heating molded solder in which a metal powder made of a Sn-3.0Ag-0.5Cu solder alloy and a metal powder made of a Sn-50In solder alloy are mixed at a ratio of 80:20.
Figure 6:
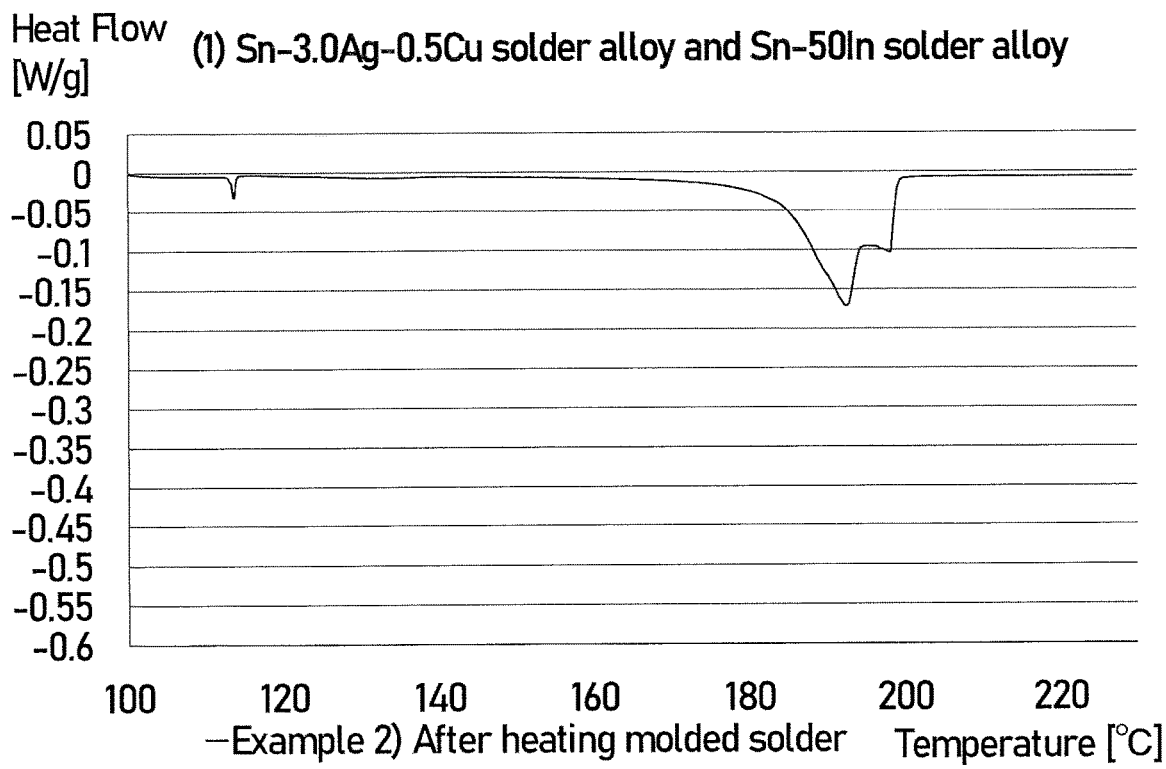
FIG. 6 is a DSC chart obtained by differential scanning calorimetry after heating molded solder in which a metal powder made of a Sn-3.0Ag-0.5Cu solder alloy and a metal powder made of a Sn-50In solder alloy are mixed at a ratio of 70:30.
Figure 7:
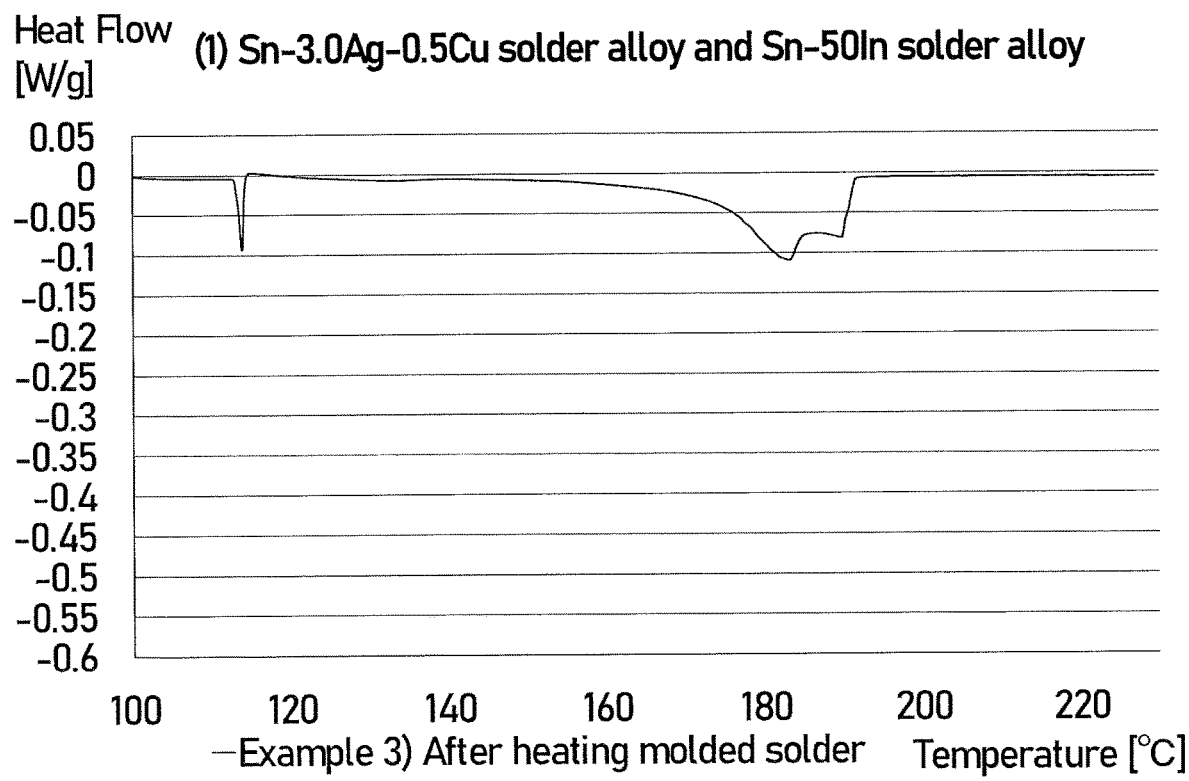
FIG. 7 is a DSC chart obtained by differential scanning calorimetry after heating molded solder in which a metal powder made of a Sn-3.0Ag-0.5Cu solder alloy and a metal powder made of a Sn-50In solder alloy are mixed at a ratio of 60:40.
Figure 8:
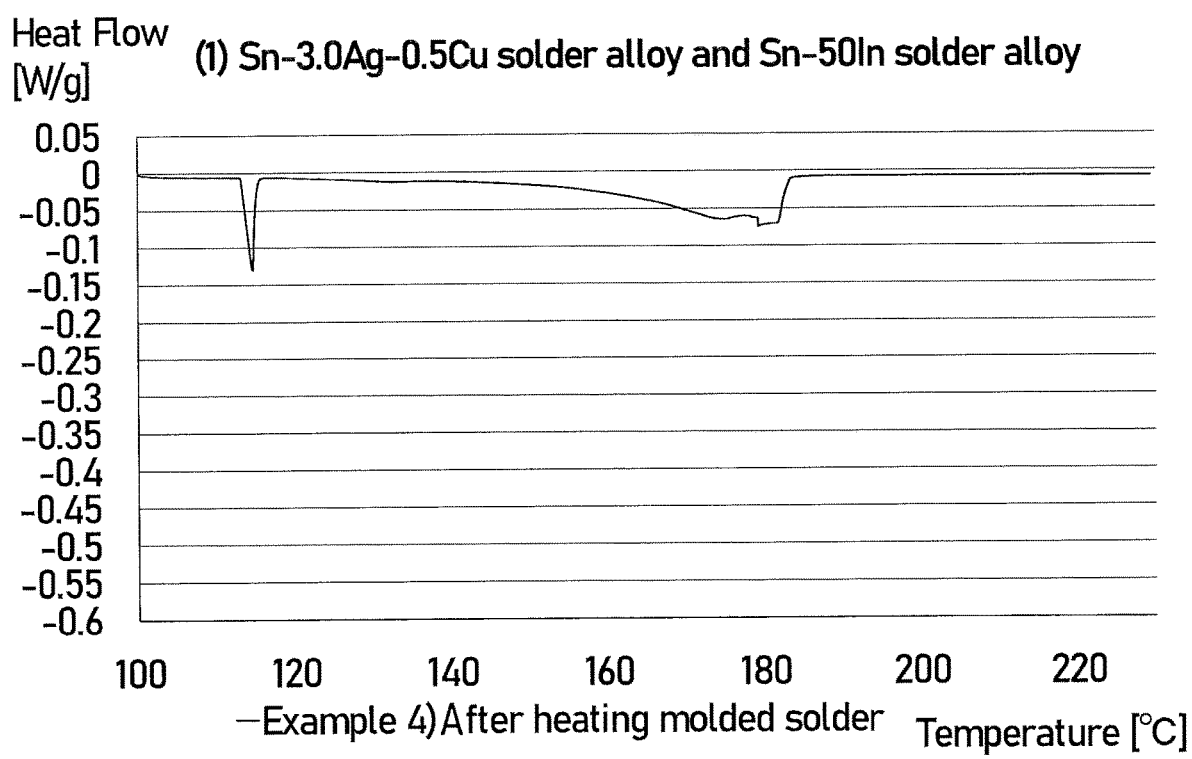
FIG. 8 is a DSC chart obtained by differential scanning calorimetry after heating molded solder in which a metal powder made of a Sn-3.0Ag-0.5Cu solder alloy and a metal powder made of a Sn-50In solder alloy are mixed at a ratio of 50:50.

As an example, FIG. 1 shows the temperature (T) and the position of the heat flow (H1) and FIG. 5 shows the temperature (T) and the position of the heat flow (H2).

Example 1) 0.005/0.228=0.022 . . . 118.949° C. (T)
Example 2) 0.004/0.323=0.012 . . . 118.886° C. (T)
Example 3) 0.001/0.386=0.003 . . . 118.888° C. (T)
Example 4) 0.007/0.374=0.019 . . . 118.886° C. (T)

(2) Sn-3.0Ag-0.5Cu Solder Alloy and Sn-58Bi Solder Alloy

A metal powder (a) made of a Sn-3.0Ag-0.5Cu solder alloy and a metal powder (c) made of a Sn-58Bi solder alloy are mixed and dispersed in a sieve so as to have the following ratios. Thus, a mixture of metal powders was produced.

Example 5) metal powder (a): metal powder (c)=90:10
Example 6) metal powder (a): metal powder (c)=80:20
Example 7) metal powder (a): metal powder (c)=70:30
Example 8) metal powder (a): metal powder (c)=60:40

Subsequently, each molded solder was produced on the same conditions in the condition (1) . In addition, the thickness of each produced molded solder is as follows.

Example 5) 800 μm
Example 6) 800 μm
Example 7) 800 μm
Example 8) 800 μm

For the molded solders of Example 5) to Example 8), the differential scanning, calorimetry was performed in the condition (1). The results are shown in FIGS. 11 to 14.

As shown in FIGS. 11 to 14, all molded solders of Example 5) to Example 8) showed endothermic peaks in the vicinity of 138° C. and 217° C.

Next, each of the molded solders of Example 5) to Example 8) was heated at 240° C. in a temperature profile condition shown in FIG. 32 for 5 minutes by a reflow device in the condition of the oxygen concentration of 100 ppm and each of the heated molded solders was subjected to differential scanning calorimetry in the above-described condition. The results are shown in FIGS. 15 to 18.

Figure 19:
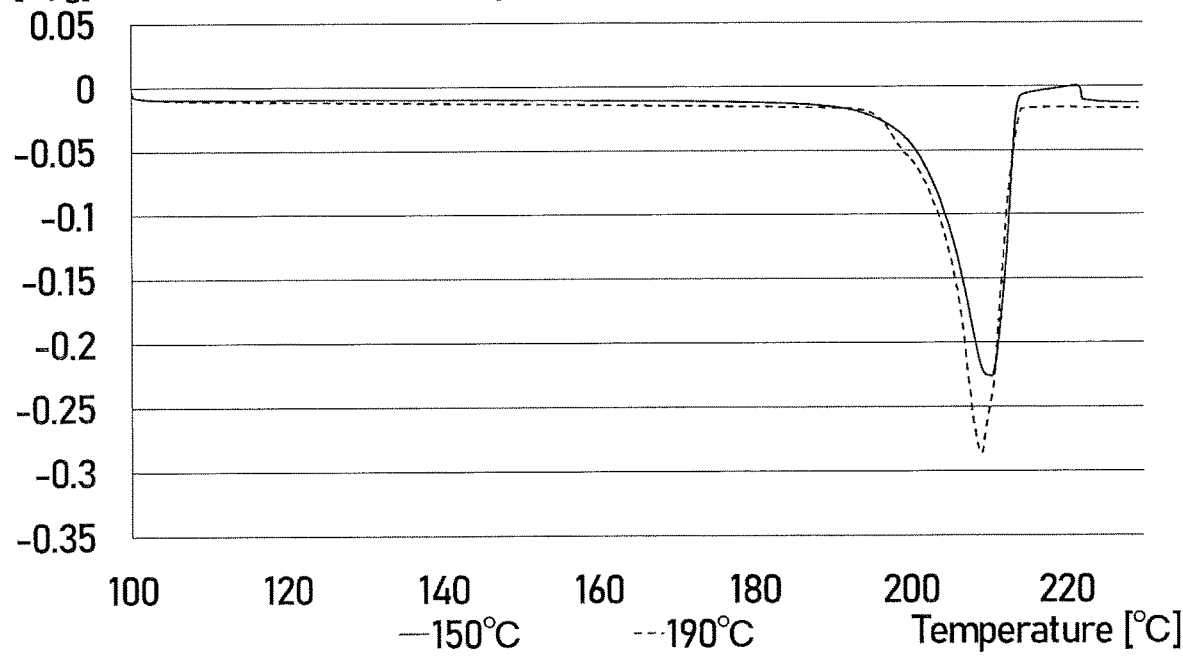
FIG. 19 is a DSC chart at each heating temperature obtained by differential scanning calorimetry after heating molded solder in which a metal powder made of a Sn-3.0Ag-0.5Cu solder alloy and a metal powder made of a Sn-58Bi solder alloy are mixed at a ratio of 90:10.

Further, the molded solder of Example 5) was heated for 5 minutes in the same condition as the profile condition shown in FIG. 32 except that the heating conditions were 150° C. and 190° C. in the condition of the oxygen concentration of 100 ppm and was subjected to differential scanning calorimetry in the above-described condition. The results are shown in FIG. 19.

The molded solders of Example 5) to Example 8) are molded by using a metal powder (a) made of a Sn-3.0Ag-0.5Cu solder alloy and having a liquidus temperature of 219° C. and a metal powder (c) made of a Sn-58Bi solder alloy and having an eutectic temperature (a melting temperature) of 138° C.

Then, since the molded solders are not heated during press-molding, both metal powders (a) and (c) are not melted and diffused and the melting temperature change is not generated. For that reason, these molded solders can sufficiently melt at least the metal powder (c) at a heating temperature of 138° C. or higher.

Further, as shown in FIGS. 11 to 18, the melting temperature change is generated in the molded solders of Example 5) to Example 8) due to the heating at the lowest liquidus temperature of the metal powders (a) and (c), that is, the liquidus temperature (138° C.) or higher of the metal powder (c).

That is, in the molded solders of Example 5) to Example 8), the metal powder (a) is dispersed in the metal powder (c) melted by heating so that an intermetallic compound having a solidus temperature higher than that of the Sn-58Bi solder alloy is produced in each molded solder. Accordingly, the melting temperature change can be generated in each molded solder after heating.

Particularly in the molded solders of Example 5) and Example 6), the endothermic peak almost disappears in the vicinity of 138° C. corresponding to the eutectic temperature (the melting temperature) of the Sn-58Bi solder alloy.

In this way, since the molded solders of Example 5) to Example 8), particularly, the molded solders of Example 5) and Example 6) are not easily remelted at 138° C. corresponding to the eutectic temperature (the melting temperature) of Sn-58Bi solder alloy, the highly reliable solder joint can be provided.

Further, in the molded solders of Example 5) to Example 8), when a temperature indicating an initial endothermic peak of the differential scanning calorimetry before heating the molded solder is indicated by (T), an absolute value of a heat flow (H1) at the temperature (T) is indicated by (H1'), and an absolute value of a heat flow (H2) at the temperature (T) in the differential scanning calorimetry after heating the molded solder is indicated by (H2'), the numerical values of the molded solders (H2')/(H1') of Example 5) to Example 8) are as below. Additionally, (T), (H1'), (H2'), and (H2')/(H1') are rounded to the fourth decimal place.

Example 5) 0.005/0.273=0.018 . . . 139.747° C. (T)
Example 6) 0.007/0.348=0.020 . . . 139.810° C. (T)
Example 7) 0.002/0.520=0.004 . . . 139.798° C. (T)
Example 8) 0.004/0.549=0.007 . . . 139.868° C. (T)

(3) Sn-3.0Ag-0.5Cu Solder Alloy and Cu

A metal powder (a) made of a Sn-3.0Ag-0.5Cu solder alloy and a metal powder (d) made of Cu are mixed and dispersed in a sieve so as to have the following ratios. Thus, a mixture of metal powders was produced.

Example 9) metal powder (a): metal powder (d)=50:50
Example 10) metal powder (a): metal powder (d)=20:80

Subsequently, each molded solder was produced on the same conditions in the condition (1) . In addition, the thickness of each produced molded solder is as follows.

Example 9) 670 μm
Example 10) 750 μm

For the molded solders of Example 9) and Example 10), the differential scanning calorimetry was performed in the condition (1) except that the measurement range is set from 100° C. to 400° C. The results are shown in FIGS. 20 and 21.

Figure 20:
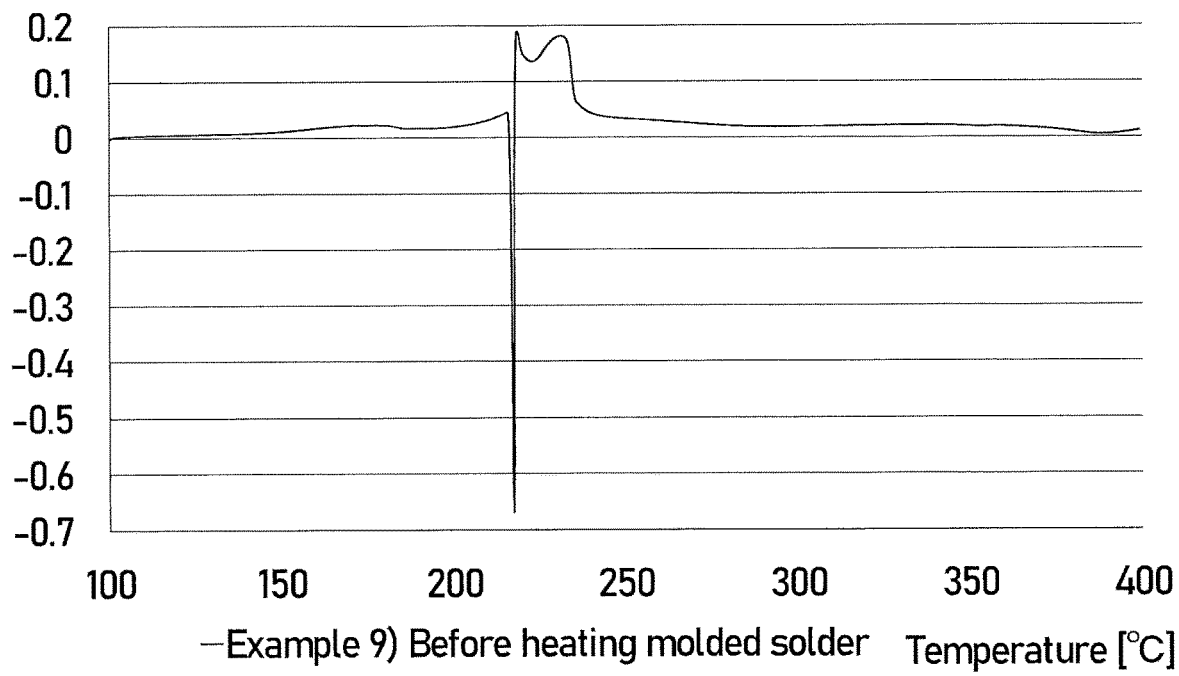
FIG. 20 is a DSC chart obtained by differential scanning calorimetry before heating molded solder in which a metal powder made of a Sn-3.0Ag-0.5Cu solder alloy and a metal powder made of Cu are mixed at a ratio of 50:50.
Figure 21:
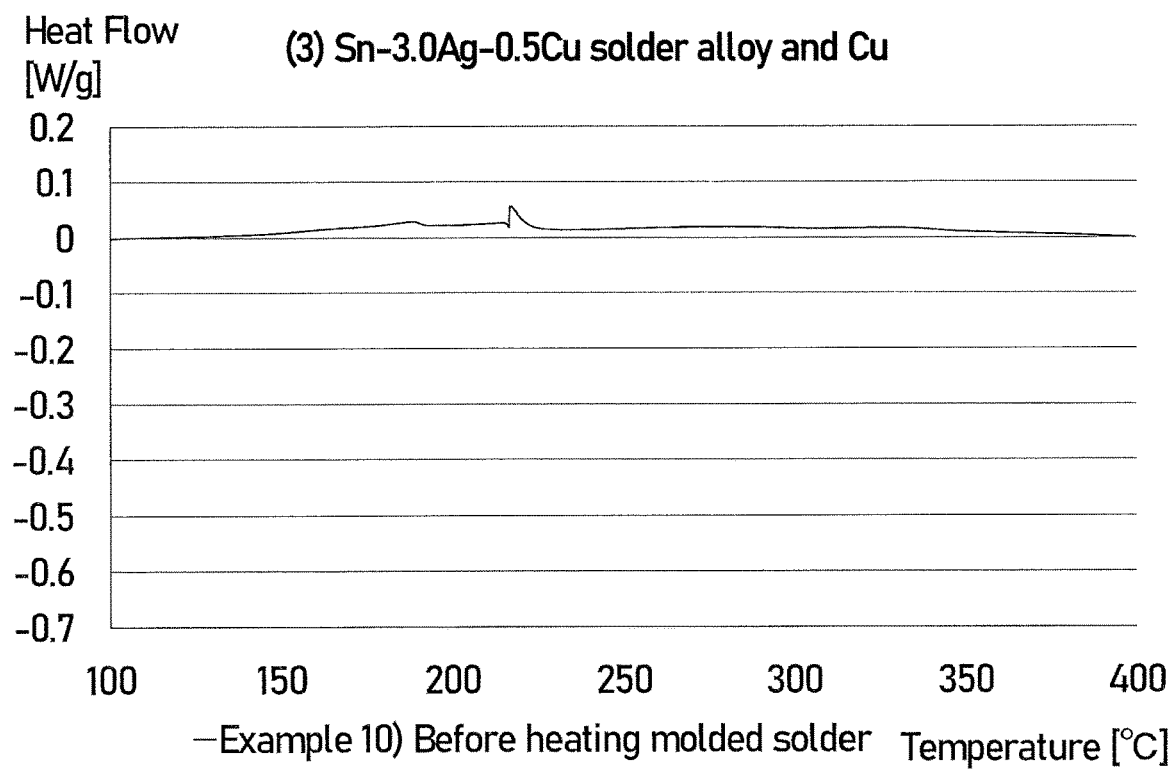
FIG. 21 is a DSC chart obtained by differential scanning calorimetry before heating molded solder in which a metal powder made of a Sn-3.0Ag-0.5Cu solder alloy and a metal powder made of Cu are mixed at a ratio of 20:80.

As shown in FIGS. 20 and 21, all molded solders of Example 9) and Example 10) showed endothermic peaks in the vicinity of 217° C.

Although not shown in FIGS. 20 and 21, the molded solders of Example 9) and Example 10) are assumed to have an endothermic peak even at 1085° C. which is the melting temperature of the metal powder (d).

Figure 22:
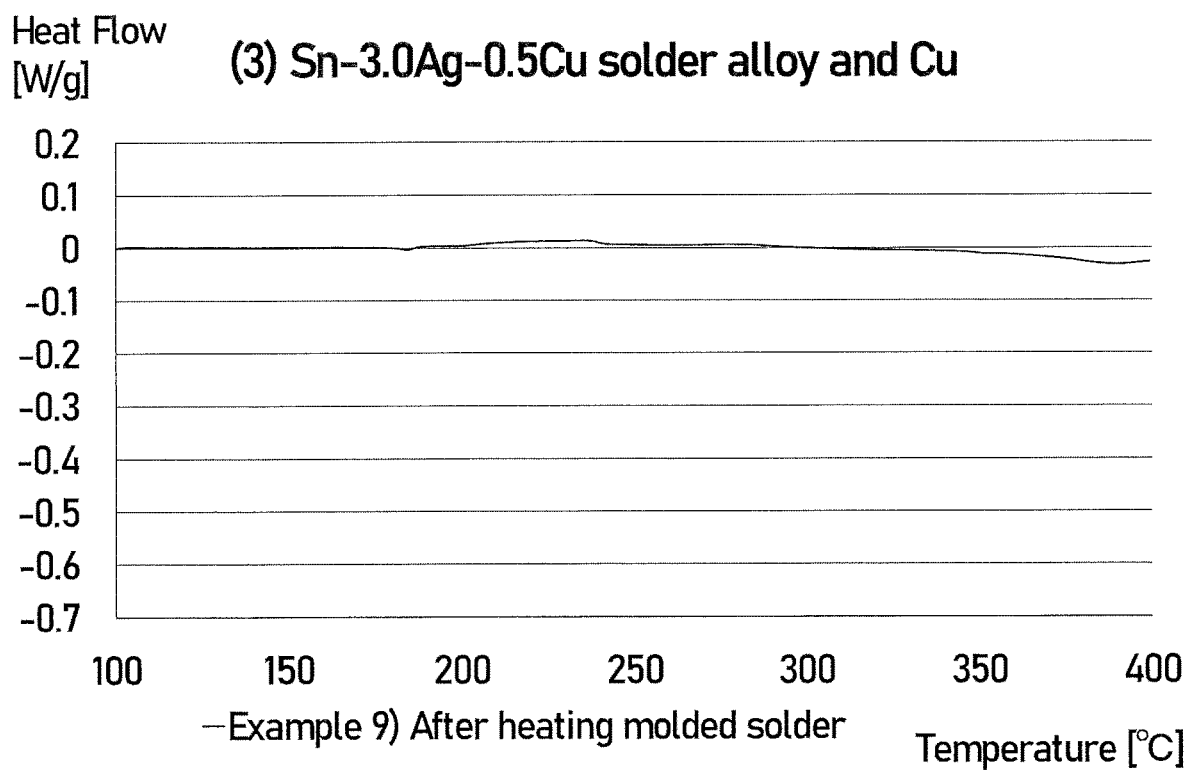
FIG. 22 is a DSC chart obtained by differential scanning calorimetry after heating molded solder in which a metal powder made of a Sn-3.0Ag-0.5Cu solder alloy and a metal powder made of Cu are mixed at a ratio of 50:50.
Figure 23:
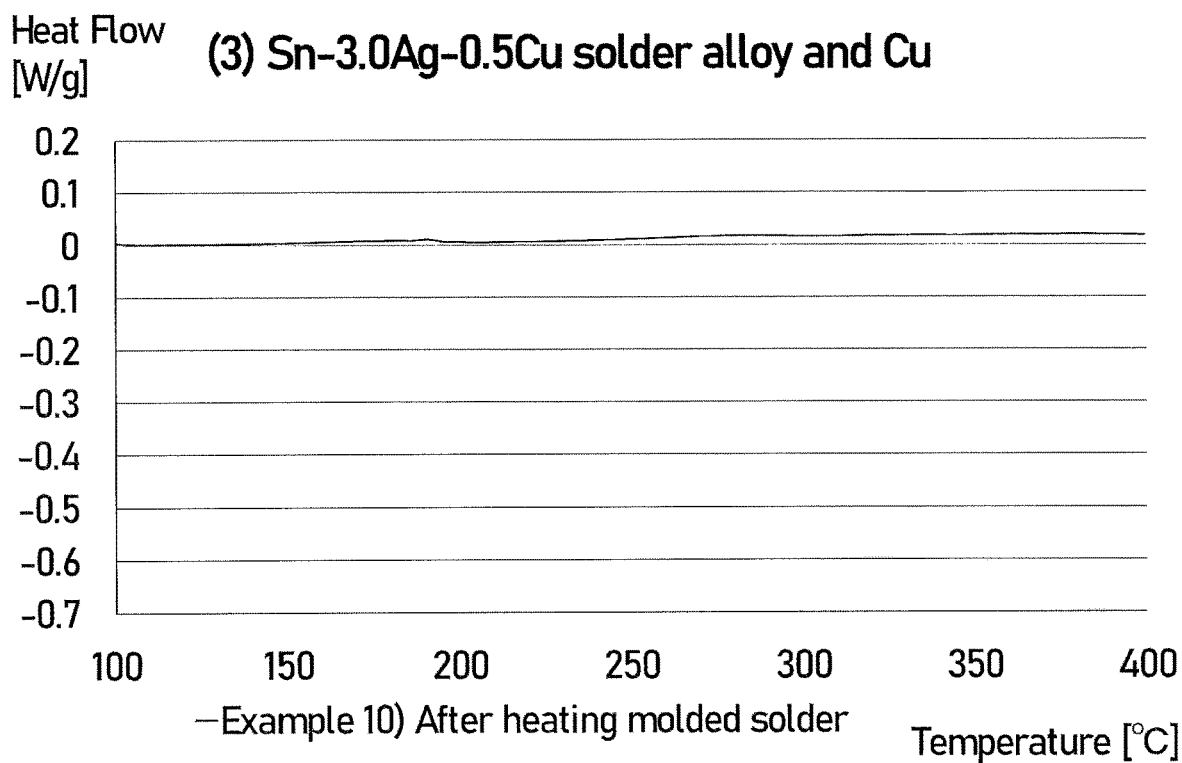
FIG. 23 is a DSC chart obtained by differential scanning calorimetry after heating molded solder in which a metal powder made of a Sn-3.0Ag-0.5Cu solder alloy and a metal powder made of Cu are mixed at a ratio of 20:80.
Figure 24:
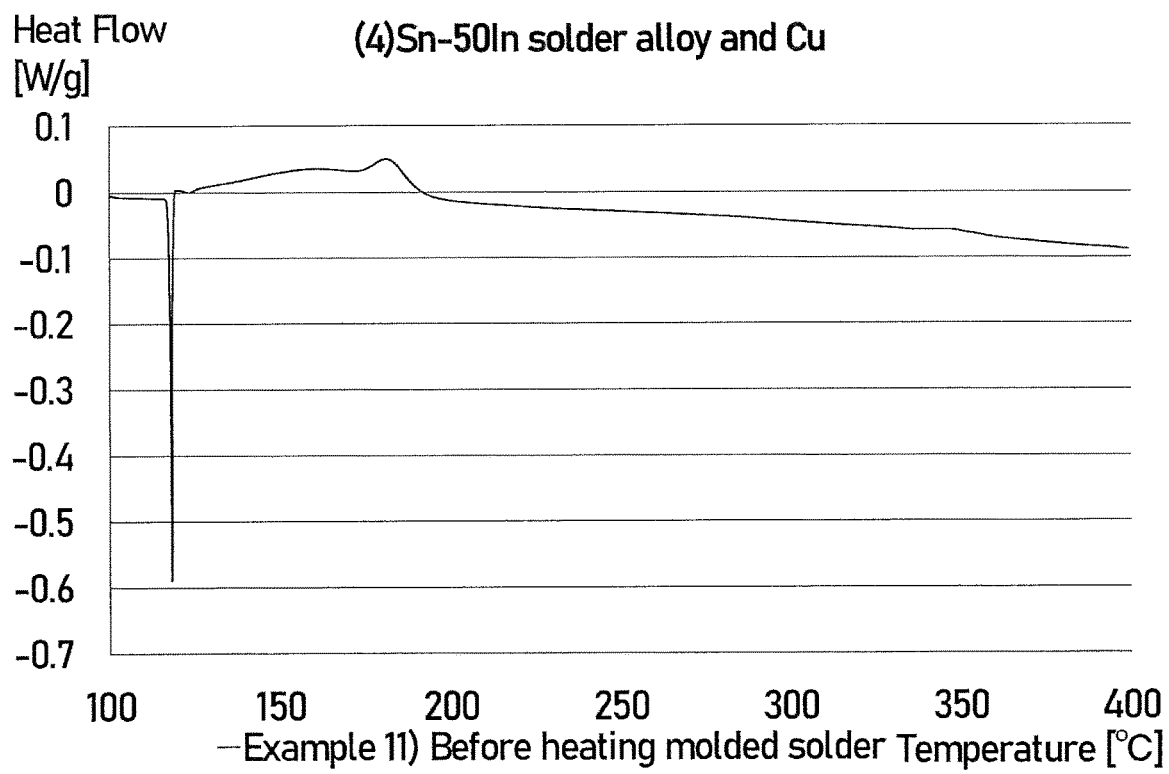
FIG. 24 is a DSC chart obtained by differential scanning calorimetry before heating molded solder in which a metal powder made of a Sn-50In solder alloy and a metal powder made of Cu are mixed at a ratio of 60:40.
Figure 25:
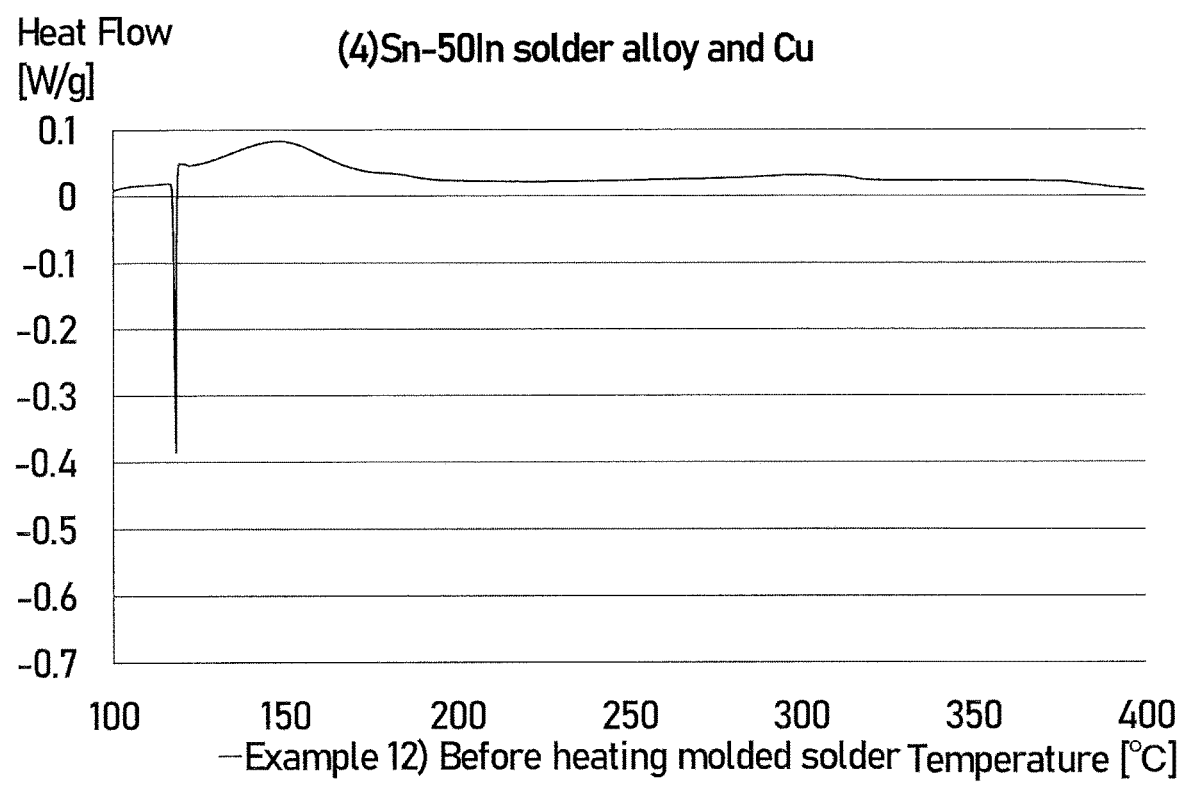
FIG. 25 is a DSC chart obtained by differential scanning calorimetry before heating molded solder in which a metal powder made of a Sn-50In solder alloy and a metal powder made of Cu are mixed at a ratio of 50:50.
Figure 26:
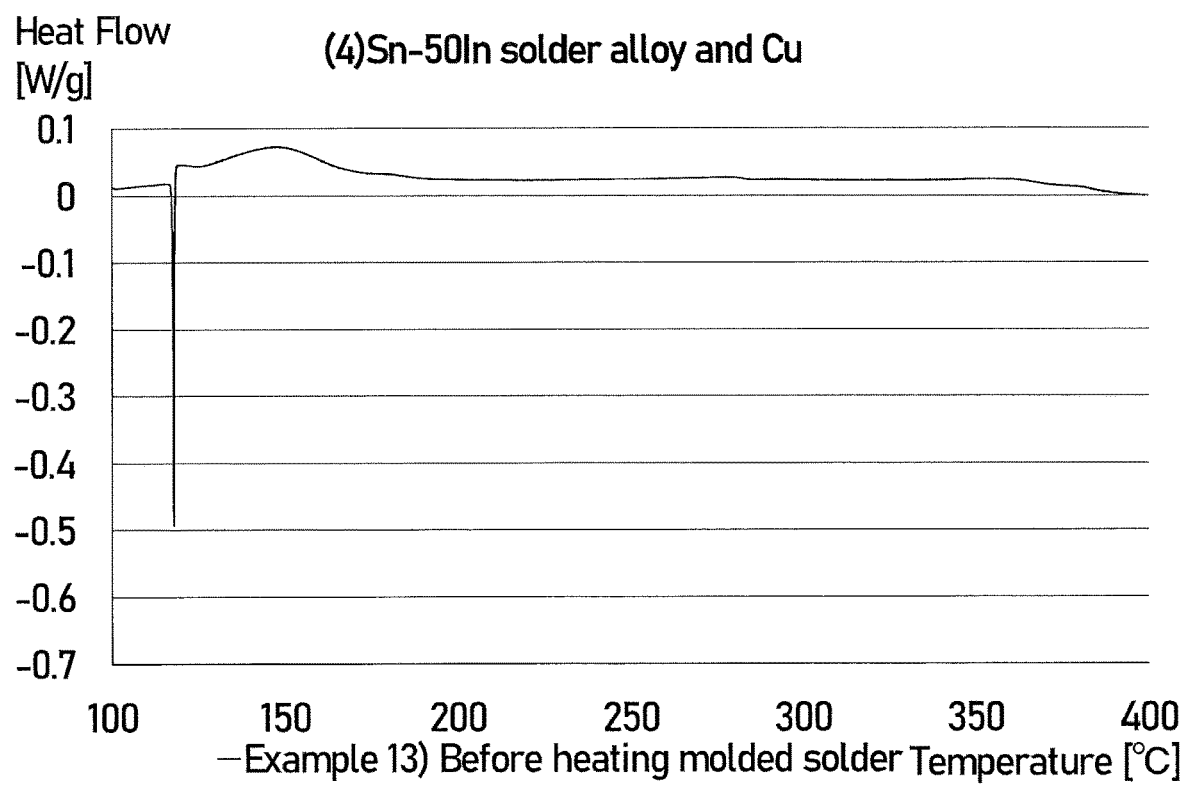
FIG. 26 is a DSC chart obtained by differential scanning calorimetry before heating molded solder in which a metal powder made of a Sn-50In solder alloy and a metal powder made of Cu are mixed at a ratio of 40:60.
Figure 27:
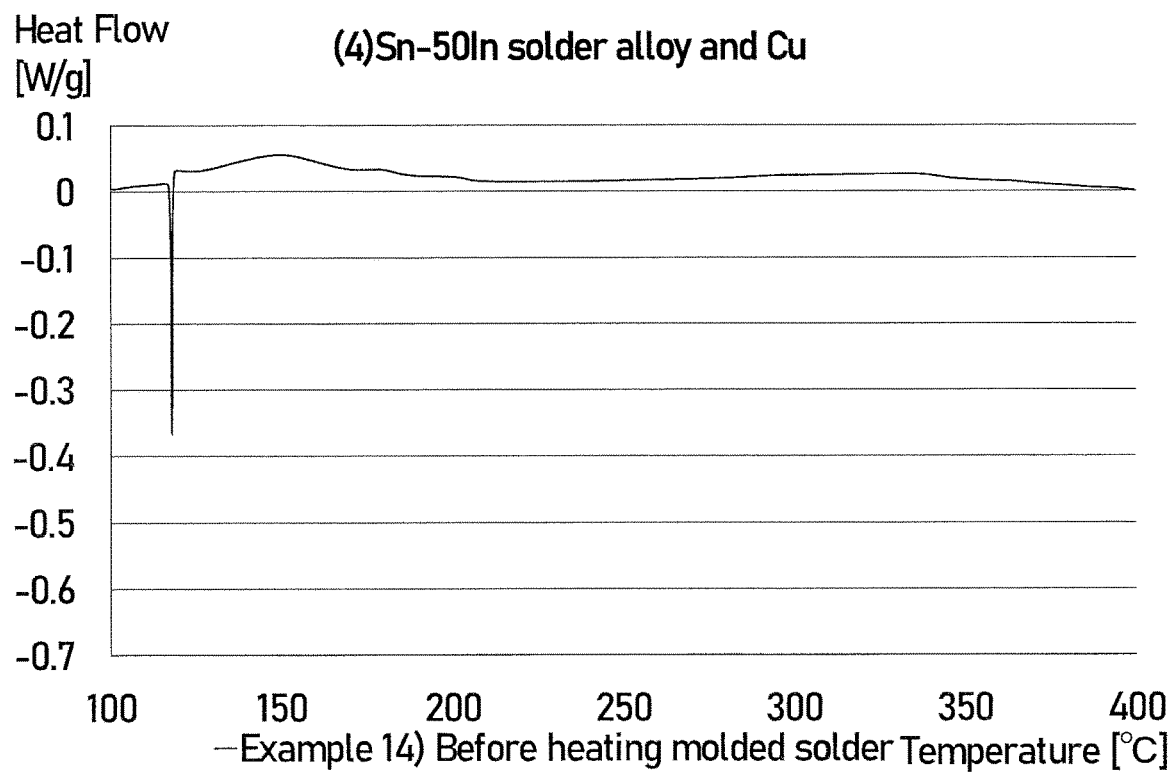
FIG. 27 is a DSC chart obtained by differential scanning calorimetry before heating molded solder in which a metal powder made of a Sn-50In solder alloy and a metal powder made of Cu are mixed at a ratio of 30:70.
Figure 28:
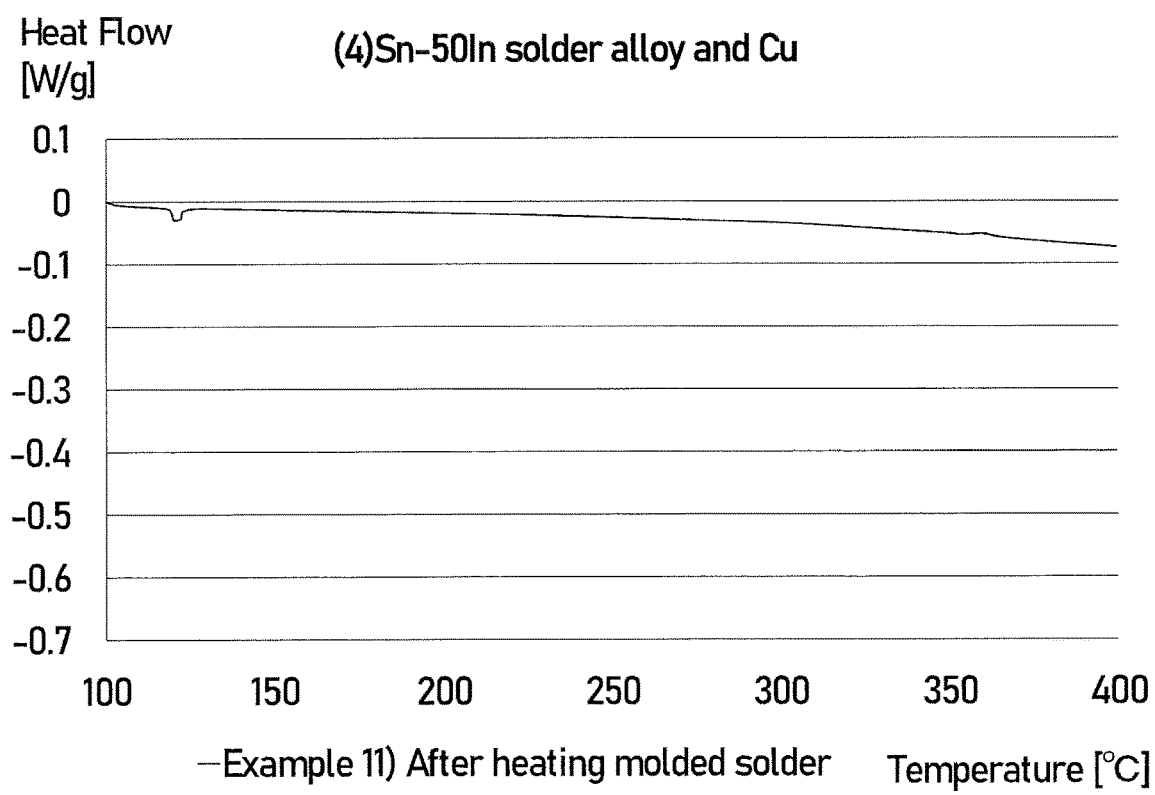
FIG. 28 is a DSC chart obtained by differential scanning calorimetry after heating molded solder in which a metal powder made of a Sn-50In solder alloy and a metal powder made of Cu are mixed at a ratio of 60:40.
Figure 29:
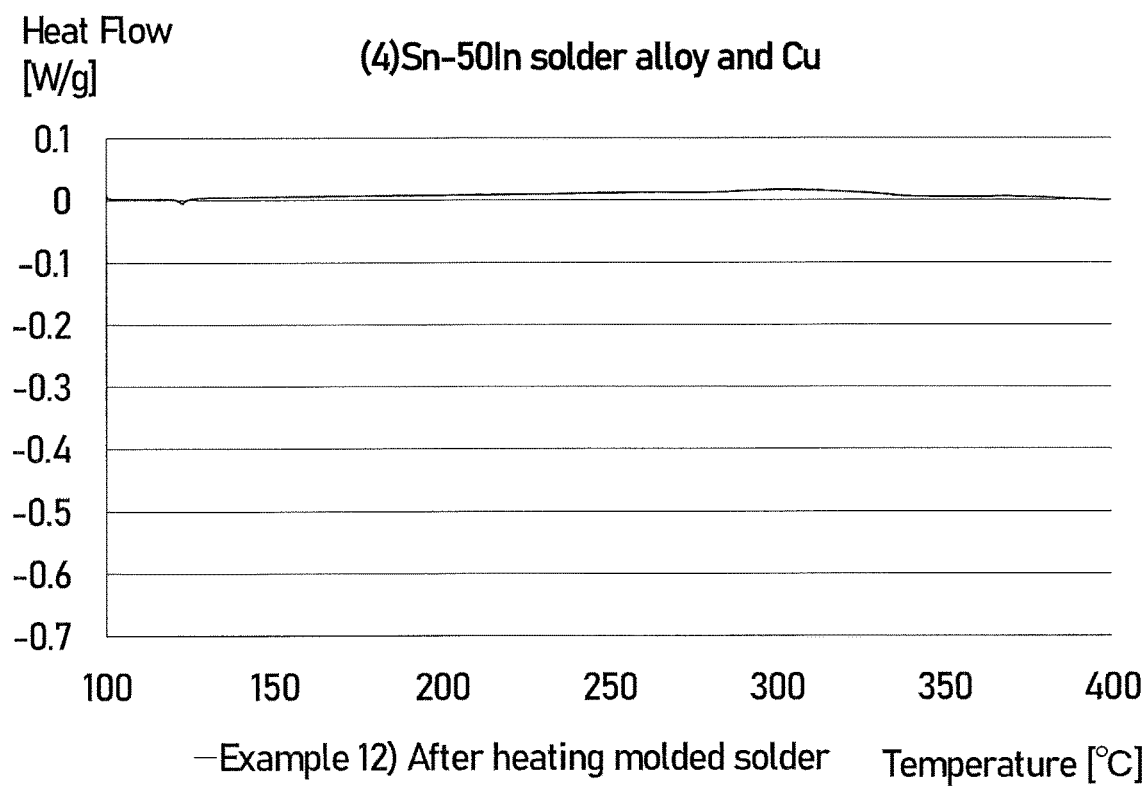
FIG. 29 is a DSC chart obtained by differential scanning calorimetry after heating molded solder in which a metal powder made of a Sn-50In solder alloy and a metal powder made of Cu are mixed at a ratio of 50:50.
Figure 30:
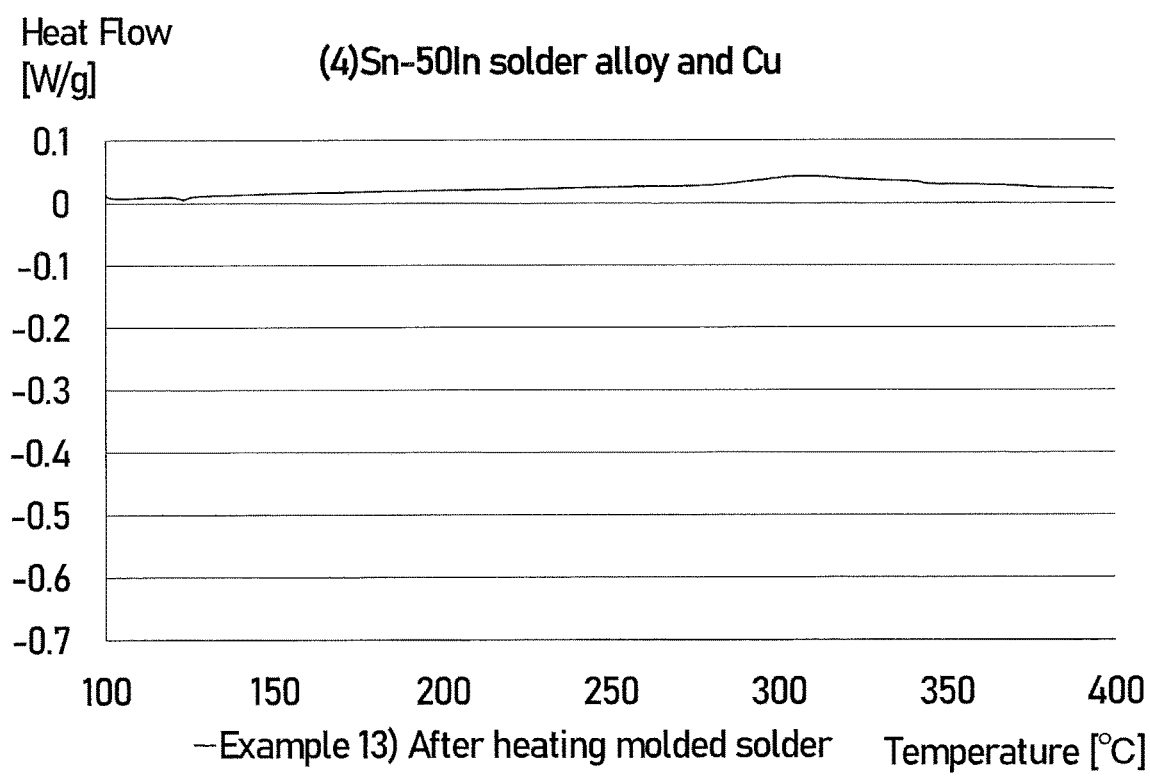
FIG. 30 is a DSC chart obtained by differential scanning calorimetry after heating molded solder in which a metal powder made of a Sn-50In solder alloy and a metal powder made of Cu are mixed at a ratio of 40:60.
Figure 31:
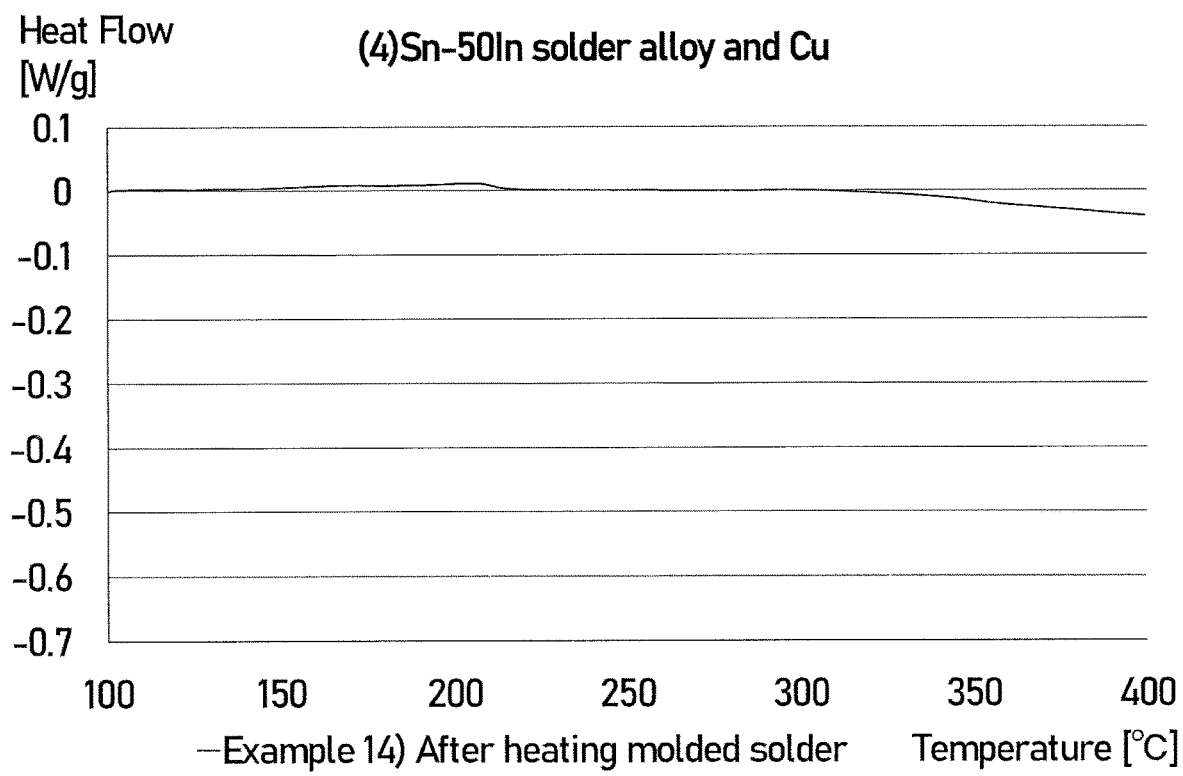
FIG. 31 is a DSC chart obtained by differential scanning calorimetry after heating molded solder in which a metal powder made of a Sn-50In solder alloy and a metal powder made of Cu are mixed at a ratio of 30:70.

Next, each of the molded solders of Example 9) and Example 10) was heated at 240° C. in a temperature profile condition shown in FIG. 32 for 5 minutes by a reflow device in the condition of the oxygen concentration of 100 ppm and each of the heated molded solders was subjected to differential scanning calorimetry in the above-described condition. The results are shown in FIGS. 22 and 23.

The molded solders of Example 9) and Example 10) are molded by using a metal powder (a) made of a Sn-3.0Ag-0.5Cu solder alloy and having a liquidus temperature of 219° C. and a metal powder (d) made of Cu and having a melting temperature of 1085° C.

Then, since the molded solders are not heated during press-molding, both metal powders (a) and (d) are not melted and diffused and the melting temperature change is not generated. For that reason, these molded solders can sufficiently melt at least the metal powder (a) at a heating temperature of 219° C. or higher.

Further, as shown in FIGS. 20 to 23, the melting temperature change is generated in the molded solders of Example 9) and Example 10) due to the heating at the lowest liquidus temperature of the metal powders (a) and (d), that is, the liquidus temperature (219° C.) or higher of the metal powder (a).

That is, in the molded solders of Example 9) and Example 10), the metal powder (d) is dispersed in the metal powder (a) melted by heating so that an intermetallic compound having a solidus. temperature higher than that of the Sn-3.0Ag-0.5Cu solder alloy is produced in each molded solder. Accordingly, the melting temperature change can be generated in each molded solder after heating.

Then, as shown in FIGS. 22 and 23, in the molded solders of Example 9) and Example 10) after heating, the endothermic peak generated in the vicinity of the solidus temperature (217° C.) of the Sn-3.0Ag-0.5Cu solder alloy is not substantially generated. Additionally, in FIG. 20, the exothermic peak occurring after 219° C. is presumed to be the heat of formation of the CuSn compound.

In this way, since the molded solders of Example 9) and Example 10) are not easily remelted at 217° C. corresponding to the solidus temperature of the Sn-3.0Ag-0.5Cu solder alloy, the highly reliable solder joint can be provided.

Further, in the molded solder of each of Example 9) and Example 10), when a temperature indicating an initial endothermic peak of the differential scanning calorimetry before heating the molded solder is indicated by (T), an absolute value of a heat flow (H1) at the temperature (T) is indicated by (H1'), and an absolute value of a heat flow (H2) at the temperature (T) in the differential scanning calorimetry after heating the molded solder is indicated by (H2'), the numerical values of the molded solders (H2')/(H1') of Example 9) and Example 10) are as below. Additionally, (T), (H1'), (H2'), and (H2')/(H1') are rounded to the fourth decimal place.

Particularly in Example 10), since there is an influence of the heat of formation of the CuSn compound, the heat flow value in differential scanning calorimetry before heating becomes 0 or more over a wide range as shown in FIG. 21.

Here, as shown in FIG. 21, in differential scanning calorimetry before heating of Example 10), the endothermic peak occurs in the vicinity of the solidus temperature (217° C.) of the Sn-3.0Ag-0.5Cu solder alloy and this temperature is set as the initial endothermic peak. Accordingly, a temperature indicating the endothermic peak is indicated by (T), a heat flow at the temperature (T) is indicated by (H1), an absolute value of the heat flow (H1) is indicated by (H1'), a heat flow of the temperature (T) in differential scanning calorimetry after heating the molded solder is indicated by (H2), and an absolute value of the heat flow (H2) is indicated by (H2').

Example 9) 0.012/0.668=0.018 . . . 217.512° C. (T)
Example 10) 0.006/0.019=0.316 . . . 216.771° C. (T)

(4) Sn-50In Solder Alloy and Cu

A metal powder (b) made of a Sn-50In solder alloy and a metal powder (d) made of Cu were mixed and dispersed in a sieve so as to have the following ratios. Thus, a mixture of metal powders was produced.

Example 11) metal powder (b): metal powder (d)=60:40
Example 12) metal powder (b): metal powder (d)=50:50
Example 13) metal powder (b): metal powder (d)=40:60
Example 14) metal powder (b): metal powder (d)=30:70

Next, the molded solders were produced in the condition (1). In addition, the thickness of each of the produced molded solders was 200 μm.

For the molded solders of Example 11) to Example 14), the differential scanning calorimetry was performed in the condition (3). The results are shown in FIGS. 24 to 27.

As shown in FIGS. 24 to 27, all molded solders of Example 11) to Example 14) showed endothermic peaks in the vicinity of 118° C.

Although not shown in FIGS. 24 to 27, the molded solders of Example 11) to Example 14) are assumed to have an endothermic peak even at 1085° C. which is the melting temperature of the metal powder (d).

Figure 33:
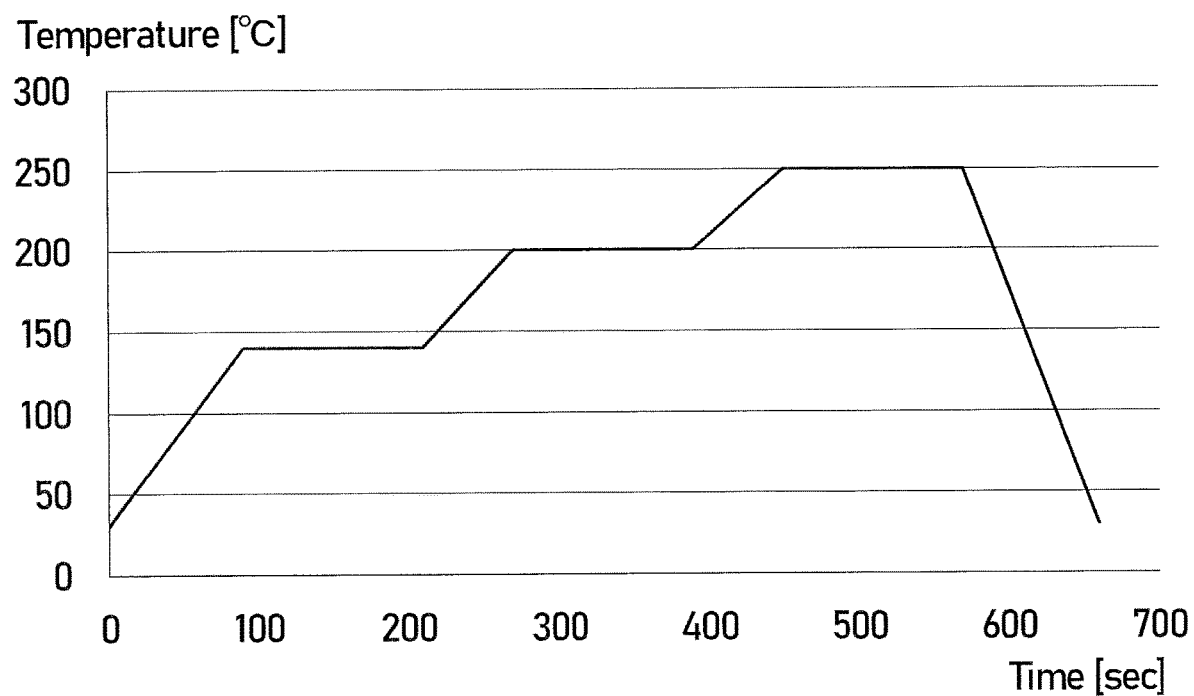
FIG. 33 is a temperature profile showing a temperature condition during reflow of molded solder using a metal powder made of a Sn-50In solder alloy and a metal powder made of Cu.

Next, each of the molded solders of Example 11) to Example 14) was heated in a temperature profile condition (2 minutes at 140° C.-2 minutes at 200° C.-2 minutes at 250° C.) shown in FIG. 33 by a reflow device in the condition of the oxygen concentration of 100 ppm and each of the heated molded solders was subjected to differential scanning calorimetry in the above-described condition. The results are shown in FIGS. 28 to 31.

The molded solders of Example 11) to Example 14) are molded by using a metal powder (b) made of a Sn-50In solder alloy and having a liquidus temperature of 120° C. and a metal powder (d) made of Cu and having a melting temperature of 1085° C.

Then, since the molded solders are not heated during press-molding, both metal powders (b) and (d) are not melted and diffused and the melting temperature change is not generated. For that reason, these molded solders can sufficiently melt at least the metal powder (b) at a heating temperature of 120° C. or higher.

Further, as shown in FIGS. 24 to 31, the molded solders of Example 11) to Example 14) have the melting temperature change due to the heating at the lowest liquidus temperature of the metal powders (b) and (d), that is, the liquidus temperature (120° C.) or higher of the metal powder (b).

That is, in the molded solders of Example 11) to Example 14), the metal powder (d) is dispersed in the metal powder (b) melted by heating so that an intermetallic compound having a solidus temperature higher than that of the Sn-50In solder alloy is produced in each molded solder. Accordingly, the melting temperature change can be generated in each molded solder after heating.

Then, as shown in FIGS. 28 to 31, in the molded solders of Example 11) to Example 14) after heating, the endothermic peak generated between the solidus temperature (118° C.) and the liquidus temperature of the Sn-50In solder alloy is not substantially generated. Additionally, in FIGS. 28 to 31, the exothermic peak after 120° C. is presumed to be the heat of formation of the CuSn compound.

In this way, since the molded solders of Example 11) to Example 14) are not easily remelted at 118° C. corresponding to the solidus temperature of the Sn-50In solder alloy, the highly reliable solder joint can be provided.

Further, in the molded solder of each of Example 11) to Example 14), when a temperature indicating an initial endothermic peak of the differential scanning calorimetry before heating the molded solder is indicated by (T), an absolute value of a heat flow (H1) at the temperature (T) is indicated by (H1'), and an absolute value of a heat flow (H2) at the temperature (T) in the differential scanning calorimetry after heating the molded solder is indicated by (H2'), the numerical values of the molded solders (H2')/(H1') of Example 11) to Example 14) are as below. Additionally, (T), (H1'), (H2'), and (H2')/(H1') are rounded to the fourth decimal place.

Example 11) 0.011/0.589 =0.019 . . . 118.249° C. (T)
Example 12) 0.002/0.385 =0.005 . . . 118.319° C. (T)
Example 13) 0.010/0.492 =0.020 . . . 118.001° C. (T)
Example 14) 0.002/0.366 =0.005 . . . 118.002° C. (T)

A summary of the results of Example 1) to Example 14) is shown in Tables 1 and 2 below. In addition, the unit about the content of each metal powder among the numerical values of Table 1 and Table 2 is set as the mass % unless otherwise specified.

Metal powders made of each metal were pressed under the following conditions at the compositions and ratios shown in Table 3 to produce molded solders according to Examples 1 to 5.

An ultrasonic sieve (made of stainless steel, aperture: 63 μm) was used for mixing and dispersing (making a mixture) of metal powders made of each metal. For pressurization, a briquette machine (product name: MP-35-02 manufactured by Shimadzu Corporation) was used.

Specifically, an aluminum ring (thickness: 1 mm, outer diameter: 34 mm, inner diameter: 26 mm) was placed on a pressure plate (lower plate) of the briquette machine and each mixture was filled in the aluminum ring. Then, a pressure plate (upper plate) was placed on each aluminum ring and this was pressed with a weight of about 330 kN to produce each molded solder. Additionally, the thickness of each of produced molded solders is shown in Table 3.

Further, in Comparative Example 1 and Comparative Example 2, each molded solder was produced by melting each metal at the composition and ratio shown in Table 3, placing the metal in a predetermined mold, and cooling the metal. Further, the molded solder was melted at the tem-

TABLE 1

| | Solidus temperature/ liquidus temperature (Melting temperature) | Example 1) | Example 2) | Example 3) | Example 4) | Example 5) | Example 6) | Example 7) | Example 8) | Example 9) | Example 10) |
|---|---|---|---|---|---|---|---|---|---|---|---|
| Sn—3.0Ag—0.5Cu | 217° C./ 219° C. | 80 | 70 | 60 | 50 | 90 | 80 | 70 | 60 | 50 | 20 |
| Sn—50In | 118° C./ 120° C. | 20 | 30 | 40 | 50 | | | | | | |
| Sn—58Bi | 138° C. | | | | | 10 | 20 | 30 | 40 | | |
| Cu | 1085° C. | | | | | | | | | 50 | 80 |
| Thickness (μm) | | 730 | 700 | 680 | 670 | 800 | 800 | 800 | 800 | 670 | 750 |
| Endothermic peak of metal having lower liquidus temperature | | Yes | Yes | Yes | Yes | Yes | Yes | Yes | Yes | Yes | Yes |
| Melting temperature change by heating | | Yes | Yes | Yes | Yes | Yes | Yes | Yes | Yes | Yes | Yes |
| (H2')/(H1') | | 0.022 | 0.012 | 0.003 | 0.019 | 0.018 | 0.020 | 0.004 | 0.007 | 0.018 | 0.316 |

TABLE 2

| | Solidus temperature/ liquidus temperature (Melting temperature) | Example 11) | Example 12) | Example 13) | Example 14) |
|---|---|---|---|---|---|
| Sn—3.0Ag—0.5Cu | 217° C./ 219° C. | | | | |
| Sn—50In | 118° C./ 120° C. | 60 | 50 | 40 | 30 |
| Sn—58Bi | 138° C. | | | | |
| Cu | 1085° C. | 40 | 50 | 60 | 70 |
| Thickness (μm) | | 200 | 200 | 200 | 200 |
| Endothermic peak of metal having lower liquidus temperature | | Yes | Yes | Yes | Yes |
| Melting temperature change by heating | | Yes | Yes | Yes | Yes |
| (H2')/(H1') | | 0.019 | 0.005 | 0.020 | 0.005 |

EXAMPLES

Hereinafter, the invention will be described with reference to examples and comparative examples. Additionally, the invention is not limited to these examples.

perature of 250° C. in Comparative Example 1 and was melted at the temperature of 170° C. in Comparative Example 2.

In addition, the unit about the content of each metal powder among the numerical values described in Table 3 is mass % unless otherwise specified.

TABLE 3

| | Solidus temperature/liquidus temperature (Melting temperature) | Particle diameter | Example 1 | Example 2 | Example 3 | Example 4 | Example 5 | Comparative Example 1 | Comparative Example 2 |
|---|---|---|---|---|---|---|---|---|---|
| Sn—3.0Ag—0.5Cu | 217° C./219° C. | 2 to 8 μm | 60 | 20 | 80 | | | 20 | 80 |
| Sn—58Bi | 138° C. | 10 to 25 μm | | | 20 | | | | 20 |
| Sn—50In | 118° C./120° C. | 10 to 25 μm | | | | 60 | 30 | | |
| Cu | 1085° C. | 2 to 8 μm | 40 | 80 | | 40 | 70 | 80 | |
| Molding method | | | Press-molding | Press-molding | Press-molding | Press-molding | Press-molding | Heating-molding | Heating-molding |
| Thickness (μm) | | | 700 | 750 | 800 | 200 | 200 | 800 | 800 |
| Endothermic peak of metal having lower liquidus temperature | | | Yes | Yes | Yes | Yes | Yes | No | No |

The molded solders of Examples 1 to 3 were subjected to differential scanning calorimetry in the following condition.

Differential Scanning Calorimeter

Product Name: MDSC Q-2000 manufactured by TA Instruments
Temperature Rise Rate: 2° C./min
Atmosphere: $N_2$ 50 ml/min
Measurement Range: 100° C. to 300° C.

In Examples 1 and 2, in the metal powder used for forming the molded solder, an endothermic peak was found between the solidus temperature and the liquidus temperature of the metal (Sn-3.0Ag-0.5Cu solder alloy) having a low liquidus temperature, that is, from 217° C. to 219° C.

Further, in Example 3, in the metal powder used for forming the molded solder, an endothermic peak was found in the vicinity of the eutectic temperature (the melting temperature) of the metal (Sn-58Bi solder alloy) having a low liquidus temperature, that is, 138° C.

Further, the molded solders of Examples 4 and 5 were subjected to differential scanning calorimetry in the following condition.

Differential Scanning Calorimeter

Product Name: MDSC Q-2000 manufactured by TA Instruments
Temperature Rise Rate: 2° C./min
Atmosphere: $N_2$ 50 ml/min
Measurement Range: 100° C. to 400° C.

In Examples 4 and 5, in the metal powder used for forming the molded solder, an endothermic peak was found between the solidus temperature and the liquidus temperature of the metal (the Sn-50In solder alloy) having a low liquidus temperature, that is, from 118° C. to 120° C.

The molded solders of Comparative Examples 1 and 2 were subjected to differential scanning calorimetry in the same conditions as those of Examples 1 and 2.

In Comparative Example 1, in the metal powder used for forming the molded solder, no endothermic peak was found between the solidus temperature and the liquidus temperature of the metal (Sn-3.0Ag-0.5Cu solder alloy) having a low liquidus temperature, that is, from 217° C. to 219° C.

Further, in Comparative Example 2, in the metal powder used for forming the molded solder, no endothermic peak was found in the vicinity of the eutectic temperature (the melting temperature) of the metal (Sn-58Bi solder alloy) having a low liquidus temperature, that is, 138° C.

In this way, in Comparative Examples 1 and 2, since the molded solder is molded by melting, the melting temperature change is generated during melting. For that reason, soldering cannot be performed by heating at 219° C. in Comparative Example 1 and at 138° C. in Comparative Example 2 and the heating temperature during soldering needs to be further increased.

Meanwhile, in Examples 1 to 5, in the metal powder used for forming the molded solder, soldering can be performed at the liquidus temperature of the metal having a low liquidus temperature and hence the heating temperature during soldering is easily adjusted. Further, the molded solder can be sufficiently melted at the heating temperature during conventional soldering.

Next, each of the molded solders of Examples 1 to 3 was heated at 240° C. in a temperature profile condition shown in FIG. 32 for 5 minutes by a reflow device in the condition of the oxygen concentration of 100 ppm and was subjected to differential scanning calorimetry in the above-described condition.

In Examples 1 and 2, the endothermic peak almost disappeared from 217° C. to 219° C. Further, in Example 3, the endothermic peak almost disappeared in the vicinity of 138° C.

Further, each of the molded solders of Examples 4 and 5 was heated in a temperature profile condition (2 minutes at 140° C.-2 minutes at 200° C.-2 minutes at 250° C.) shown in FIG. 33 for 11 minutes by a reflow device in the condition of the oxygen concentration of 100 ppm and was subjected to differential scanning calorimetry in the above-described condition. Here, the endothermic peak almost disappeared from 118° C. to 120° C.

In this way, in the molded solders of Examples 1 to 5, it is found that the melting temperature change is generated due to heating. Then, since such a molded solder is not easily remelted at the heating temperature, the highly reliable solder joint can be provided after soldering.

Next, the solderability of the molded solders of Examples 1 to 5 was checked.

First, the molded solders of Examples 1 to 3 were respectively adjusted to the size of 6 mm×6 mm. Further, a copper plate (a) of 6 mm×6 mm×0.3 mmt and a copper plate (b) of 30 mm×30 mm ×0.3 mmt were prepared.

Flux (product name: BF-30 manufactured by Tamura Corporation) was thinly applied to both surfaces of the molded solders of Examples 1 to 3 and each molded solder was placed on the copper plate (b).

Then, the copper plate (a) was placed on the surface of each molded solder not in contact with the copper plate (b) and this was subjected to the reflow using a high-temperature observation device (product name: SK-5000 manufactured by Sanyo Seiko Co., Ltd.) for 5 minutes in the temperature profile condition shown in FIG. 32 so as to produce each test piece. Additionally, the oxygen concentration was set to 100 ppm.

Each test piece was checked by using a scanning electron microscope so as to confirm the presence or absence of joining of the copper plates (a) and (b) and each molded solder, and in each of the test pieces, the copper plates (a) and (b) and each molded solder could be joined.

Further, each of the molded solders of Examples 4 and 5 was adjusted to the size of 10 mm×10 mm, a weight of 2 g was placed on the copper plate (a), and the reflow was performed for 11 minutes in the temperature profile condition (2 minutes at 140° C.-2 minutes at 200° C.-2 minutes at 250° C.) shown in FIG. 33. In the same condition except these, the test pieces were produced. Additionally, the oxygen concentration was set to 100 ppm.

Each test piece was checked by using a scanning electron microscope so as to confirm the presence or absence of joining of the copper plates (a) and (b) and each molded solder, and in each of the test pieces, the copper plates (a) and (b) and each molded solder could be joined.

In this way, since the molded solders according to Examples 1 to 5 can be formed without using the flux, the generation of voids can be suppressed. Further, since the heating is not required for the molding, soldering can be performed at the liquidus temperature of the metal having the lowest liquidus temperature in the metal powder used for the molding. Further, since the molded solders can change the melting temperature of the molded solder (the solder joint) after soldering by easily dispersing the metal powder made of metal having a high liquidus temperature in the melted solder alloy during soldering, the molded solder is not easily remelted at the heating temperature during soldering. Accordingly, the highly reliable solder joint can be provided.

What is claimed is:

1. A molded solder consisting of:
   a first metal powder having a first solidus temperature and a first liquidus temperature, the first metal powder is a metal powder made of Sn-50In solder alloy;
   a second metal powder having a second solidus temperature and a second liquidus temperature, the second metal powder is a metal powder made of Sn-3.0Ag-0.5Cu solder alloy, the second liquidus temperature being higher than the first liquidus temperature;
   the first metal powder and the second metal powder are contained in a mass ratio of 20:80 to 50:50;
   the molded solder being constructed so that a mixture of the first metal powder and the second metal powder are press-molded;
   the molded solder being constructed so that a solidus temperature of the molded solder becomes higher after the first metal powder has been melted by heating the molded solder at a temperature equal to or higher than the first liquidus temperature; and
   an absolute value (H1') of a heat flow (H1) at a temperature (T) indicating an initial endothermic peak of a differential scanning calorimetry before heating the molded solder at a temperature equal to or higher than the first liquidus temperature and an absolute value (H2') of a heat flow (H2) at the temperature (T) of a differential scanning calorimetry after heating the molded solder satisfy the following formula (1):

$$(H2')/(H1') \leq 0.2 \tag{1}$$

2. The molded solder according to claim 1, wherein a temperature difference between the first liquidus temperature and the second liquidus temperature is 50° C. or higher.

3. A molded solder consisting of:
   a first metal powder having a first solidus temperature and a first liquidus temperature, the first metal powder is a metal powder made of Sn-3.0Ag-0.5Cu solder alloy;
   a second metal powder having a melting temperature, the second metal powder is a metal powder of Cu, the melting temperature being higher than the first liquidus temperature;
   the first metal powder and the second metal powder are contained in a mass ratio of 20:80 to 50:50;
   the molded solder being constructed so that a mixture of the first metal powder and the second metal powder are press-molded; and
   the molded solder being constructed so that a solidus temperature of the molded solder becomes higher after the first metal powder has been melted by heating the molded solder at a temperature equal to or higher than the first liquidus temperature.

4. The molded solder according to claim 3, wherein a temperature difference between the first liquidus temperature and the melting temperature is 50° C. or higher.

5. The molded solder according to claim 3, wherein an absolute value (H1') of a heat flow (H1) at a temperature (T) indicating an initial endothermic peak of a differential scanning calorimetry before heating the molded solder at a temperature equal to or higher than the first liquidus temperature and an absolute value (H2') of a heat flow (H2) at the temperature (T) of a differential scanning calorimetry after heating the molded solder satisfy the following formula (1):

$$(H2')/(H1') \leq 0.2 \tag{1}$$

6. A molded solder consisting of:
   a first metal powder having a first solidus temperature and a first liquidus temperature, the first metal powder is a metal powder made of Sn-50In solder alloy;
   a second metal powder having a melting temperature, the second metal powder is a metal powder of Cu, the melting temperature being higher than the first liquidus temperature;
   the first metal powder and the second metal powder are contained in a mass ratio of 30:70 to 60:40;
   the molded solder being constructed so that a mixture of the first metal powder and the second metal powder are press-molded; and
   the molded solder being constructed so that a solidus temperature of the molded solder becomes higher after the first metal powder has been melted by heating the molded solder at a temperature equal to or higher than the first liquidus temperature.

7. The molded solder according to claim 6, wherein a temperature difference between the first liquidus temperature and the melting temperature is 50° C. or higher.

8. The molded solder according to claim 6, wherein an absolute value (H1') of a heat flow (H1) at a temperature (T) indicating an initial endothermic peak of a differential scanning calorimetry before heating the molded solder at a temperature equal to or higher than the first liquidus temperature and an absolute value (H2') of a heat flow (H2) at the temperature (T) of a differential scanning calorimetry after heating the molded solder satisfy the following formula (1):

$$(H2')/(H1') \leq 0.2 \qquad (1).$$

* * * * *